United States Patent [19]
Miller et al.

[11] Patent Number: 5,331,580
[45] Date of Patent: Jul. 19, 1994

[54] DATA CAPTURE SYSTEM WITH COMMUNICATING AND RECHARGING DOCKING APPARATUS, AND MODULAR PRINTER AND HAND-HELD DATA TERMINAL MEANS COOPERABLE THEREWITH

[75] Inventors: Phillip Miller; Steven E. Koenck; Jerry L. Walter, all of Cedar Rapids, Iowa; Joseph J. Kubler, Nederland, Colo.; Keith K. Cargin, Jr., Cedar Rapids, Iowa; George E. Hanson, Cedar Rapids, Iowa; Patrick H. Davis, Cedar Rapids, Iowa; Steven R. Kunert, Cedar Rapids, Iowa; Darald R. Schultz, Cedar Rapids, Iowa

[73] Assignee: Norand Corporation, Cedar Rapids, Iowa

[21] Appl. No.: 46,048

[22] Filed: Apr. 12, 1993

Related U.S. Application Data

[63] Continuation of Ser. No. 948,034, Sep. 21, 1992, abandoned, which is a continuation of Ser. No. 347,602, May 3, 1989, abandoned, which is a continuation-in-part of Ser. No. 305,302, Jan. 31, 1989, abandoned.

[51] Int. Cl.⁵ .................................................. G06F 1/00
[52] U.S. Cl. .............................. 364/708.1; 364/710.13
[58] Field of Search ............... 235/375, 472, 383, 384, 235/385; 455/89, 90, 347, 348; 340/825.34; 379/445–450, 433, 144, 58, 426; 364/708, 709.12, 708.1, 710.13; 439/310, 297, 298

[56] References Cited

U.S. PATENT DOCUMENTS

| | | | |
|---|---|---|---|
| 3,826,900 | 7/1974 | Moellering | 235/435 |
| 4,038,535 | 7/1977 | Aldridge et al. | 364/708 |
| 4,345,147 | 8/1982 | Aaron et al. | 235/385 |
| 4,396,985 | 8/1983 | Ohara | 364/405 |
| 4,409,470 | 10/1983 | Shepard et al. | 235/435 |
| 4,468,750 | 8/1984 | Chamoff et al. | 364/401 |
| 4,588,938 | 4/1986 | Liautaud et al. | 455/89 |
| 4,621,189 | 11/1986 | Kumar et al. | 235/472 |
| 4,706,096 | 11/1987 | Sato | 235/385 |
| 4,723,281 | 2/1988 | Peiker et al. | 379/58 |
| 4,727,245 | 2/1988 | Dobbins et al. | 235/472 |
| 4,739,183 | 4/1988 | Tokura et al. | 340/825.06 |
| 4,742,335 | 5/1988 | Vogt | 340/825.08 |
| 4,746,932 | 5/1988 | Sato | 346/76 PH |
| 4,751,648 | 6/1988 | Sears, III et al. | 364/550 |
| 4,766,300 | 8/1988 | Chadima, Jr. et al. | 235/472 |
| 4,773,032 | 9/1988 | Uehara et al. | 364/709.12 |
| 4,801,786 | 1/1989 | Stobbe | 235/472 |
| 4,835,372 | 5/1989 | Gombrich et al. | 235/375 |
| 4,845,738 | 7/1989 | Takano | 379/58 |
| 4,853,521 | 8/1989 | Claeys et al. | 235/375 |
| 4,857,716 | 8/1989 | Gombrich et al. | 235/375 |
| 5,031,098 | 7/1991 | Miller et al. | 364/405 |
| 5,180,232 | 1/1992 | Chadima, Jr. et al. | 400/88 |

Primary Examiner—Thomas G. Black
Assistant Examiner—Michael Zanelli
Attorney, Agent, or Firm—McAndrews, Held & Malloy, Ltd.

[57] ABSTRACT

In an exemplary embodiment, a portable data device is insertable into a docking receptacle for communication with other devices. In route delivery operations and the like, a hand-held computerized data terminal is coupled with a docking unit for recharging of its batteries and communication e.g. with a printer. Preferably, the terminal can be loaded into the docking receptacle with a single motion. The terminal may be automatically positively locked in the receptacle as it is loaded with one hand; thus the terminal may be securely held in the receptacle of a portable printer even if the printer is dropped or subjected to a severe jolt. Removal may be accomplished by a push button-eject or by a single motion with one hand. The disclosure includes various docking configurations which may have non-critical alignment requirements, provide electrical contacts sealed against moisture, and economically accommodate different size terminals and the like. Programmed control of the printer-terminal system provides for feedback from the printer to a primary controller to confirm that each line of data has been actually printed.

12 Claims, 18 Drawing Sheets

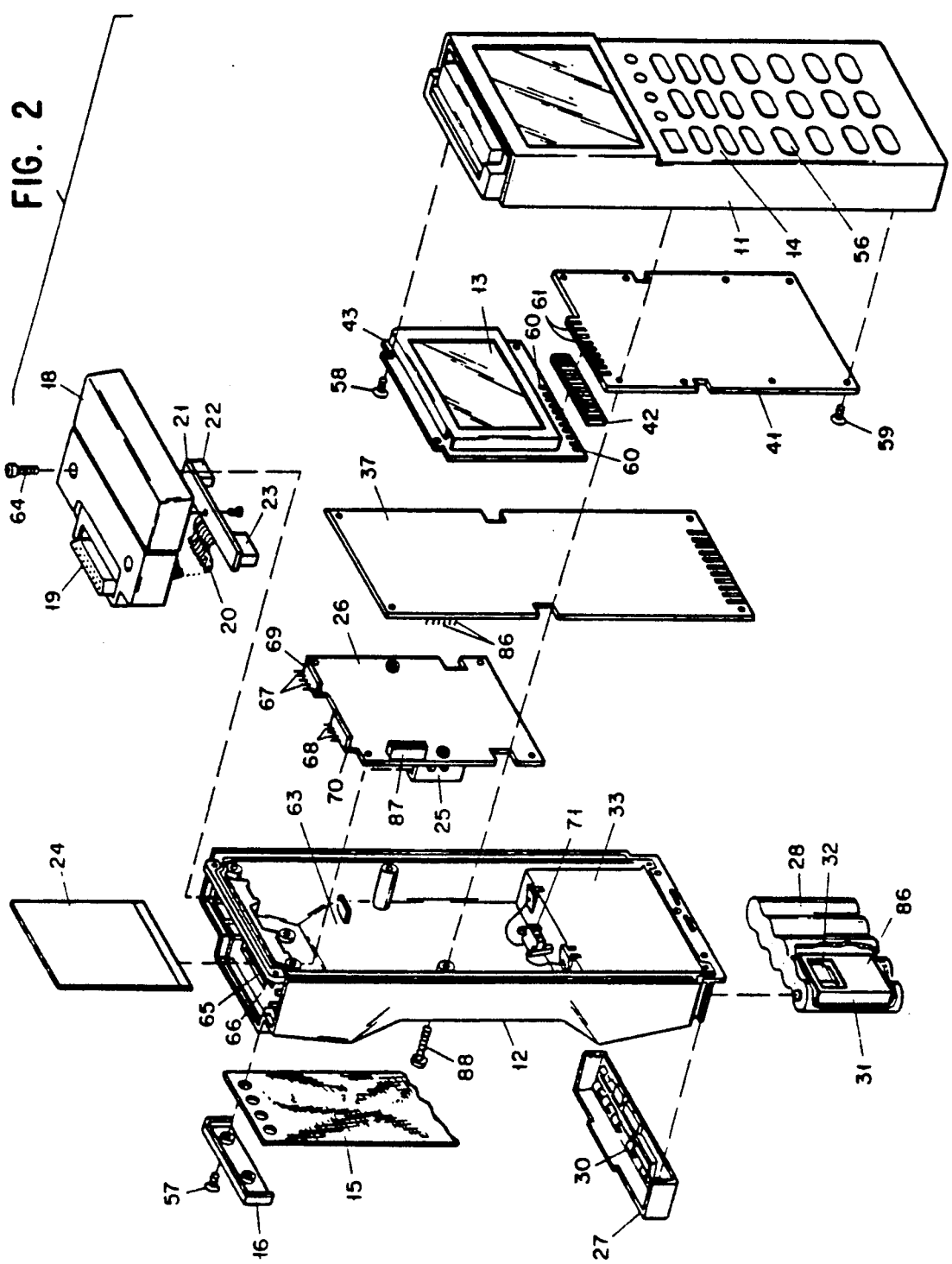

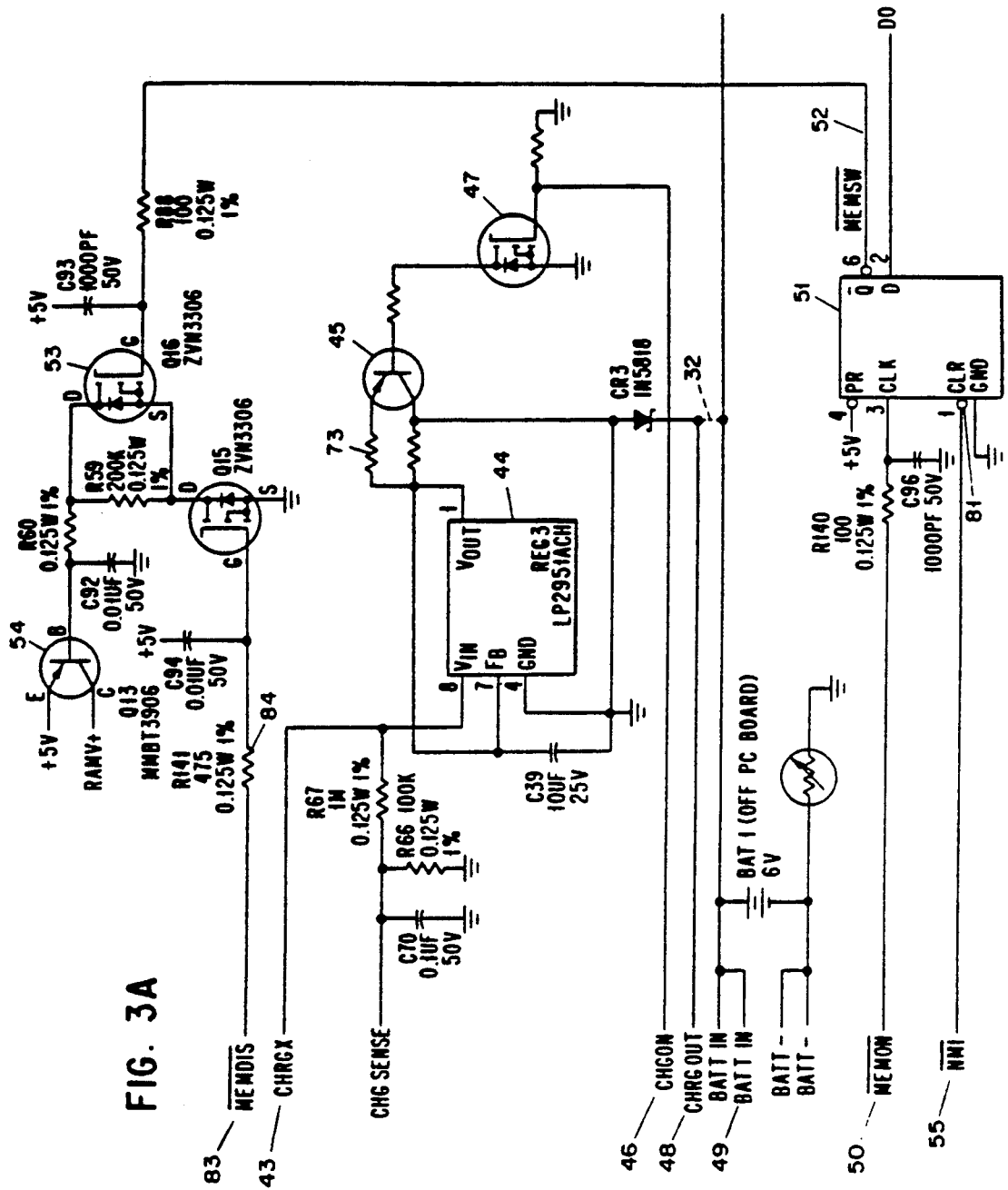

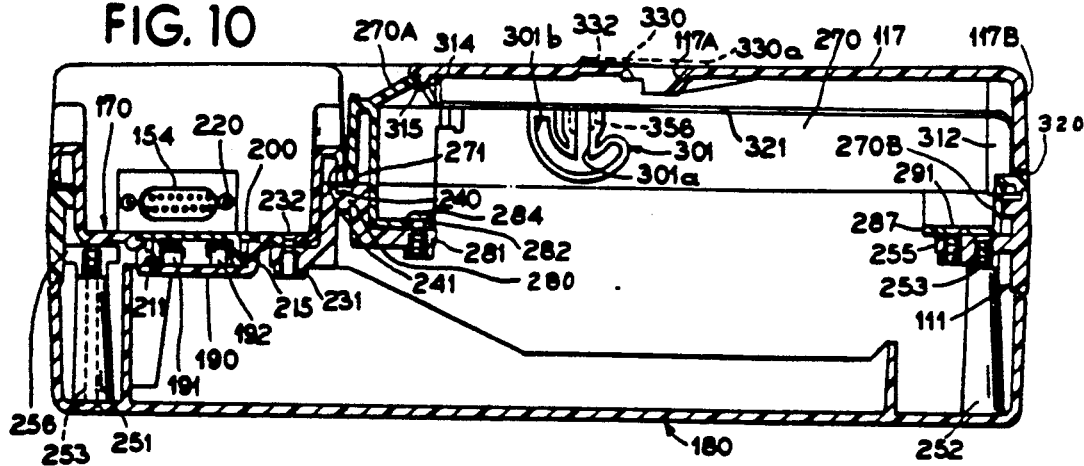

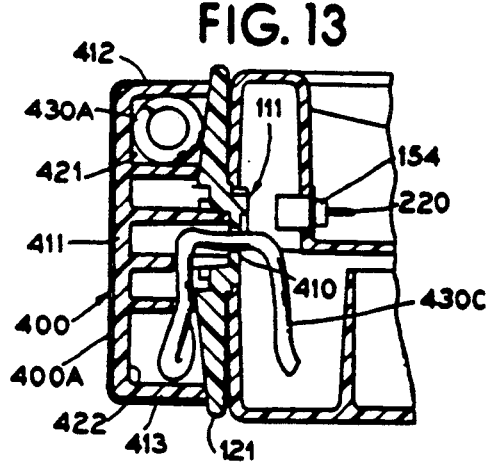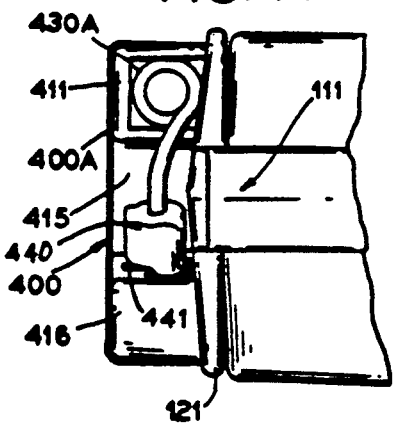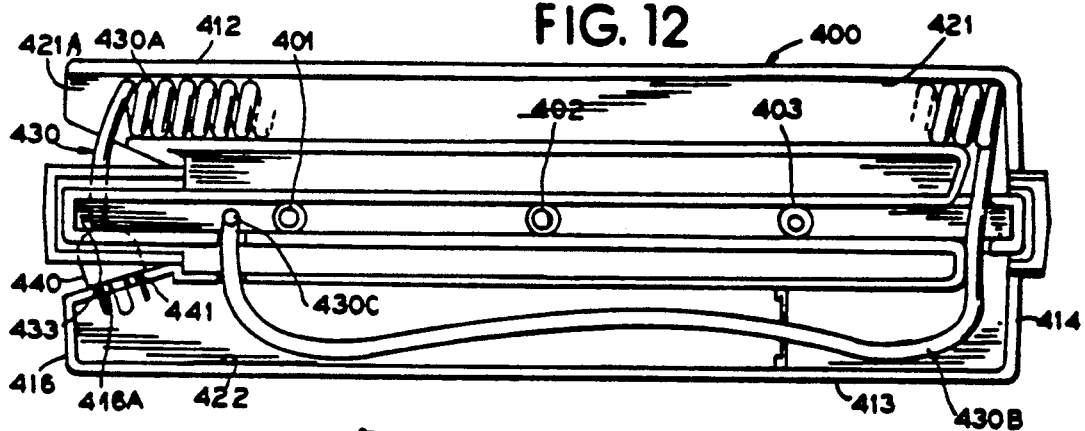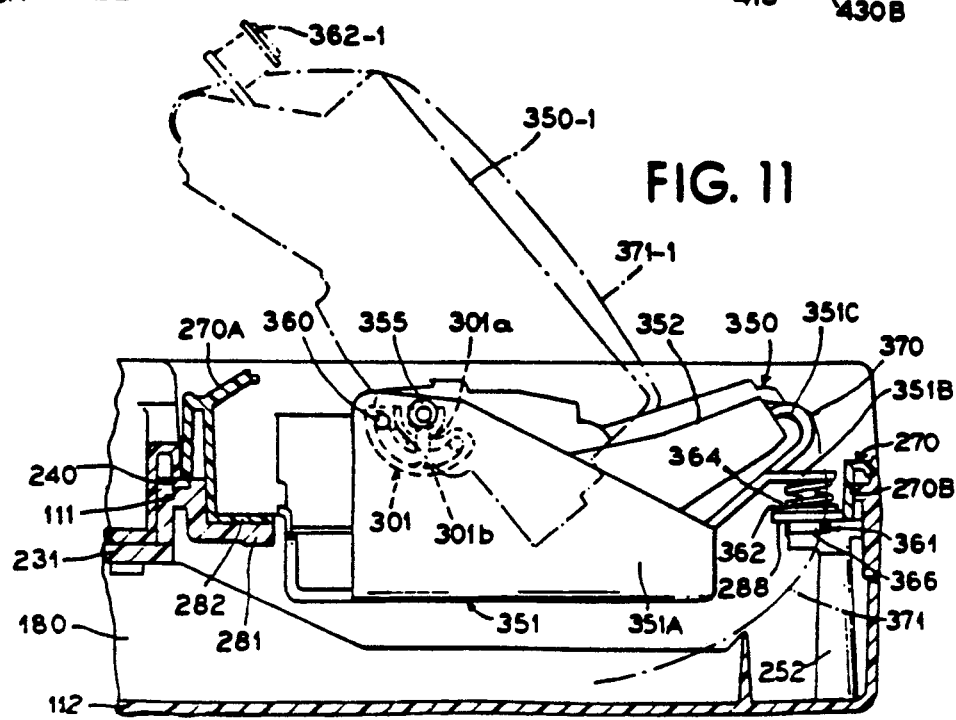

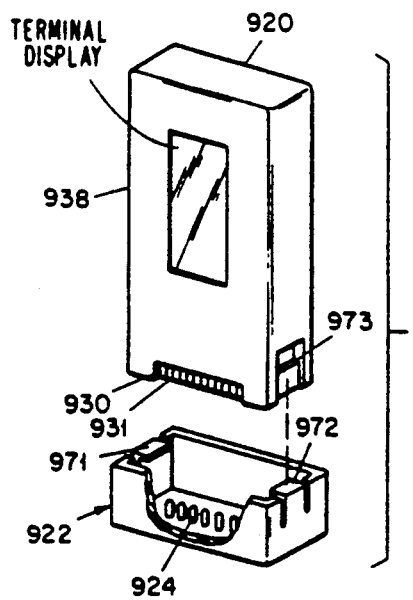
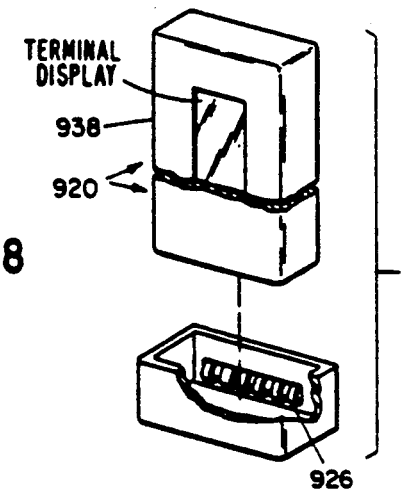
FIG. 28
FIG. 29
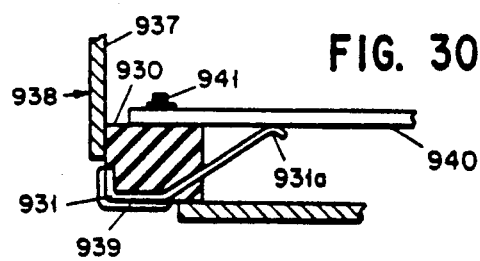
FIG. 30
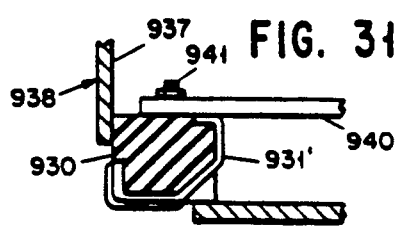
FIG. 31
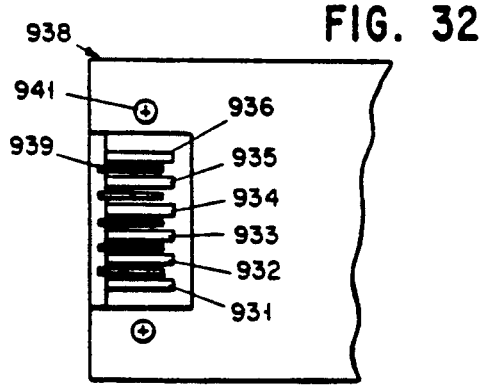
FIG. 32
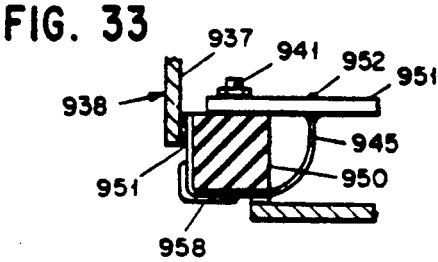
FIG. 33
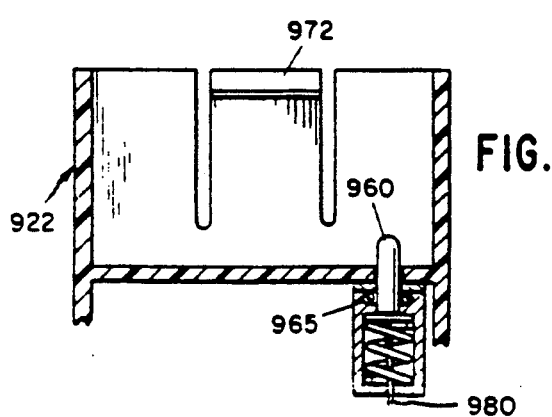
FIG. 34
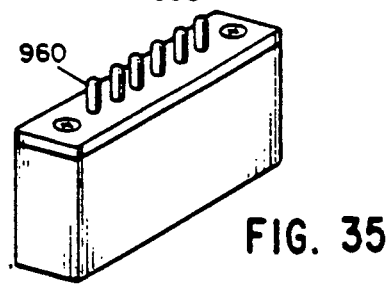
FIG. 35
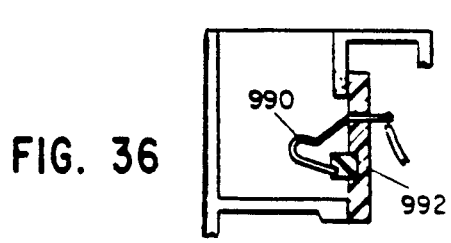
FIG. 36

DATA CAPTURE SYSTEM WITH COMMUNICATING AND RECHARGING DOCKING APPARATUS, AND MODULAR PRINTER AND HAND-HELD DATA TERMINAL MEANS COOPERABLE THEREWITH

CROSS REFERENCE TO RELATED APPLICATIONS

The present application is a continuation of a copending application in the names of Phillip Miller, Steven E. Koenck, Jerry L. Walter, Joseph J. Kubler, Keith K. Cargin, Jr., George E. Hanson, Patrick H. Davis, Steven R. Kunert, and Darald R. Schultz, U.S. Ser. No. 07/948,034, filed Sep. 21, 1992, now abandoned, which is a continuation of application U.S. Ser. No. 07/347,602, filed May 3, 1989, now abandoned, which is a continuation-in-part application in the names of Phillip Miller, Steven E. Koenck, Joseph J. Kubler, Keith K. Cargin, Jr. and George E. Hanson, "VEHICLE DATA SYSTEM", U.S. Ser. No. 07/305,302, filed Jan. 31, 1989, now abandoned. Reference is made pursuant to 35 U.S.C. 120 to said application Ser. No. 07/305,302, filed Jan. 31, 1989, and the entire disclosure thereof including the drawings is incorporated herein by reference.

AUTHORIZATION PURSUANT TO 37 CFR 1.71(d) and (e)

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

In the route distribution industry, where a truck driver makes numerous deliveries to individual customers and locations, it is necessary for the driver to make a record of each delivery and to provide a delivery ticket or invoice to each customer along with the goods delivered. In one approach a printing device is mounted within the truck driver's vehicle. The printer receives a hand-held data entry unit and provides invoices or delivery tickets.

Briefcase type printer devices have been developed so that invoices can be created within the customers' stores. Such briefcase configurations may have a receptacle for receiving a data entry terminal unit.

In the data capture field generally, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the fields of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data capture system with docking apparatus adaptable to a wide range of terminal means, and which furthermore could be quickly and simply loaded in a relatively foolproof manner, and without requiring attention and care from operators engaged in physically demanding and arduous work routines. A docking apparatus would be desirable that completely avoids the use of mating pin and socket type electrical connections, and that does not rely on a specialized configuration of the terminal, e.g. the provision of an optical scanner tip which may be used for data communication.

SUMMARY OF THE INVENTION

The present invention relates particularly to data capture systems utilizing portable data terminal means which are to be held in one hand during data capture operation; however the invention is also applicable to portable data terminal means which may be mounted e.g. on a belt or e.g. on a vehicle during data capture operation. The data terminal means preferably will be of size and weight to be held in one hand, even though not so held during data capture operation. Also the data terminal means may be provided with batteries so as to be capable of portable operation, and such batteries may be rechargeable.

In a typical case, the portable data terminal means will have user interface means such as a manually operated data input (e.g. a keyboard) and/or a data output (e.g. a liquid crystal display), and will contain data storage means for the storage of programming instructions and/or program data, and/or for the storage of data capture information.

In accordance with an important aspect of the present invention, a docking apparatus removably receives portable data terminal means for purposes of data communication e.g. with a host computer and/or for the recharging of rechargeable batteries, and is so configured that the terminal means may have electrical contact pad means generally flush with the exterior of the terminal means. Preferably an abutting type engagement between the terminal contact pad means and cooperating electrical contact means of the docking apparatus is used for each electrical connection which is required at the docking apparatus, and the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have e.g. twelve external contact pads and be intended for interfacing only with systems having provision for open abutment type interconnection.

The terminal receptacle means is preferably arranged so that with the terminal secured therein, the or each line of the terminal display remains visually observable in a convenient orientation relative to a driver of a vehicle for example. (See Appendix A which has not been reproduced here, but which is available together with Appendices B, C and D in the application papers.) Also all of the key positions of the terminal keyboard are manually accessible, the legends on the keyboard having an orientation so as to be conveniently readable, e.g. by the driver of the vehicle. In particular the axis of each line of the display and of each row of key positions should be generally horizontal (rather than vertical) and the alphanumeric characters of the terminal display and keyboard legends should be upright (rather than inverted) as viewed by the operator.

Also most preferably the terminal can be inserted into the receptacle with one hand and the terminal is securely retained. Ideally the terminal is automatically secured with a snap type action which is perceptible to the operator. While in some instances a resilient bias may serve to firmly position the terminal for steady reliable electrical contact at each abutting type contact position in spite of vehicle jarring and vibration or the like. For enhanced security of retention of the terminal with the docking apparatus, e.g. in portable applications, it is preferred that the terminal be automatically physically locked in its receptacle rather than relying on spring urged means or detent type action. With an actual mechanical blocking of the release of the terminal from its receptacle, the terminal is not Jarred loose even if the portable device is dropped or receives an accidental sharp blow or the like.

One preferred embodiment of data capture terminal unit is provided with a plurality of electrically conductive pads generally coplanar with the external surface of the housing. Such electrically conductive pads may be interconnected by internal circuitry to the connector elements of a D-style connector mounted upon the housing end cap such that recharge power and data communication pathways may be made through either or both of the contact means. The electrically conductive pads are positioned such that they may be engaged with mating elements having sufficient resilience to maintain stable electrical contact therebetween while the terminal is in a docking receptacle or the like.

An object of the invention is to provide a ruggedized, easily manufactured hand-held data entry terminal unit particularly adapted for use in the route distribution industry, and a modular printer system cooperable therewith.

Another object of the invention is to provide a hand-held data entry terminal device which is conveniently shaped to comfortably fit in the hand of a user.

Another object of the invention is to provide a hand-held data entry terminal device having an engaging support strap mounted thereto which is easily removed by the user of the device.

Another object of the invention is to provide a hand-held data entry terminal device having an external telecommunications capability so as to reliably communicate with a printer during the course of printing operation of the printer.

Features of the present invention reside in a one-hand-loaded docking unit adaptable to an existing commercial modular printer system, a communication system adaptable to communication between a hand-held data capture terminal and a modular printer having such a one-hand-loaded docking unit, and to a ruggedized and/or water repellant hand-held data capture unit cooperable with the one-hand-loaded docking unit.

Preferably the docking unit provides a snap action effect signifying secure loading of the terminal, and most preferably loading with one hand takes place without requiring substantial exertion and yet a secure positive locking is achieved. A button may provide for release of the terminal unit, and may require only moderate manual pressure to actuate. Ideally the manual release is accompanied with a degree of mechanical ejection of the terminal unit, without requiring an increase in the number of parts for the docking unit.

Other objects, features and advantages will be apparent from the following detailed description, taken in connection with the accompanying drawings, and from the individual features and relationships of the respective appended claims.

BRIEF DESCRIPTION OF THE DRAWING FIGURES

FIG. 2 is a somewhat diagrammatic exploded view of the hand-held terminal illustrated in FIG. 1.

FIGS. 3A and 3B are schematic diagrams showing the major electronic circuits and components contained within the terminal of FIGS. i and 2 and the interconnections between them, FIG. 3A showing preferred circuit details for the power control components of FIG. 3B.

FIG. 9 is a somewhat diagrammatic top plan view of the portable version of the invention, with the printer module, printer cover and instrument panel finish strip removed to show interior construction of the printer case and paper tray module.

FIG. 10 is a somewhat diagrammatic longitudinal sectional view of the portable embodiment of FIG. 6.

FIG. 11 is an enlarged somewhat diagrammatic partial longitudinal sectional view showing the printer module within the printer case, and indicating a pivoted position of the printer module in dot dash outline wherein access is provided to the paper tray bin of the paper tray module.

FIG. 12 is a somewhat diagrammatic side elevational view of an AC adapter module which may replace the foot at the left side of the portable version of FIG. 6 so as to provide for operation of the printer system of FIGS. 6-11 from commercial alternating current power.

FIG. 13 is a somewhat diagrammatic partial transverse sectional view showing the AC adapter module of FIG. 12 operatively secured with the portable embodiment of FIGS. 6-11 in place of the foot member.

FIG. 14 is a somewhat diagrammatic partial elevational view showing the frontal end of the AC adapter module of FIGS. 12 and 13.

FIG. 15 is a somewhat diagrammatic perspective view of a non-portable version of the printer system which utilizes the frame module, and other components of FIGS. 6-11, rearranged so as to be particularly suited to mounting in a delivery vehicle or the like.

Figure 16:
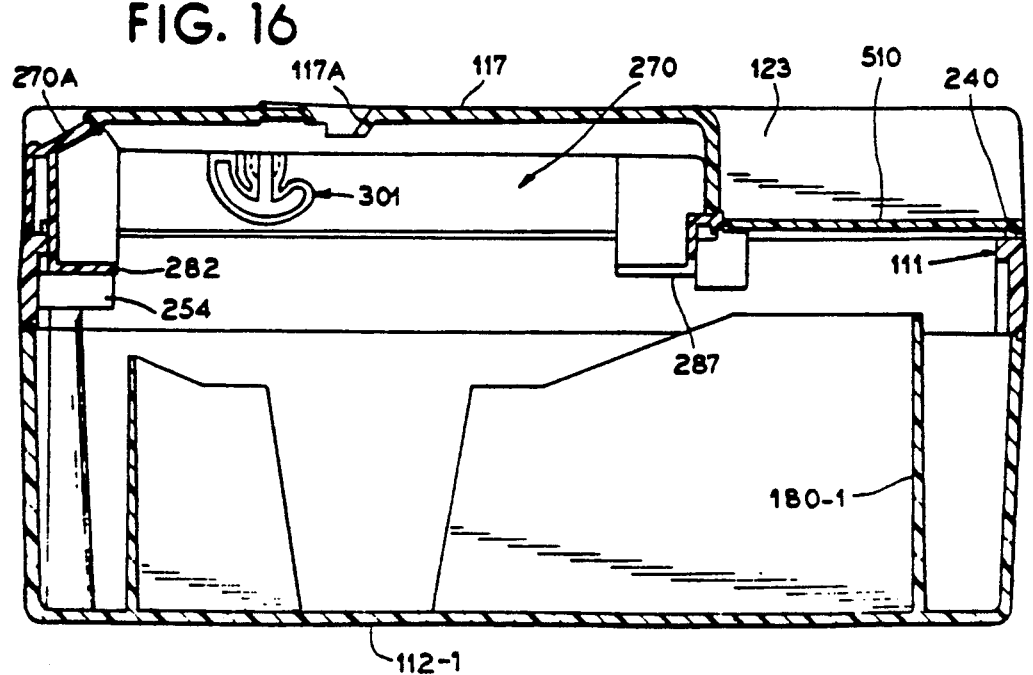
FIG. 16 is a somewhat diagrammatic longitudinal sectional view of the device of FIG. 15, and showing use of a paper tray module of greater capacity than that of FIGS. 6-11.
Figure 17:
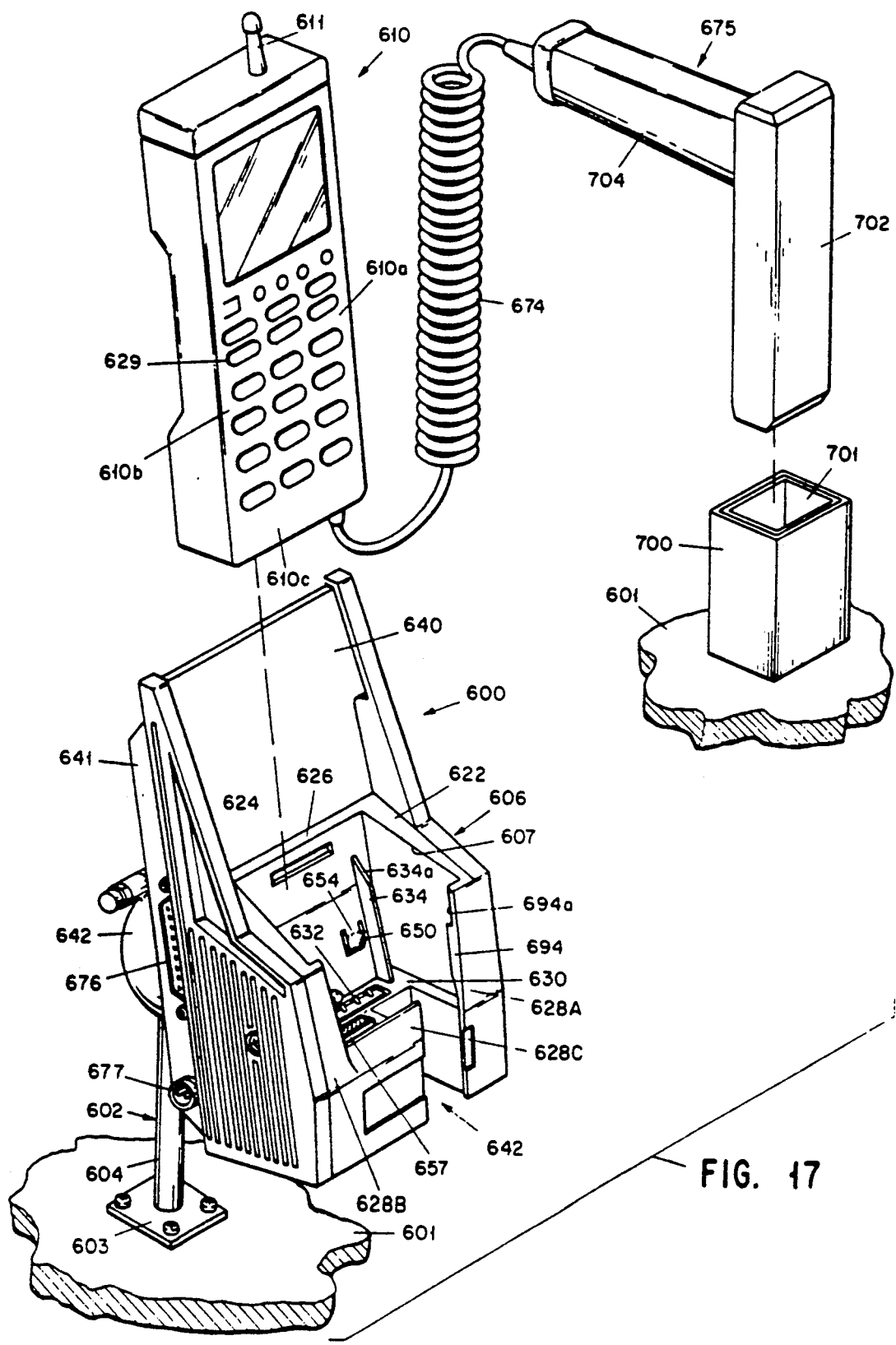
FIG. 17 is a somewhat diagrammatic perspective view showing portions of a vehicle frame mounting a vehicle docking unit for receiving a hand-held data terminal, and mounting a reader head holster for receiving a bar code or RF tag reader or the like and shown coupled with the data terminal by means of an extensible cable.
Figure 18:
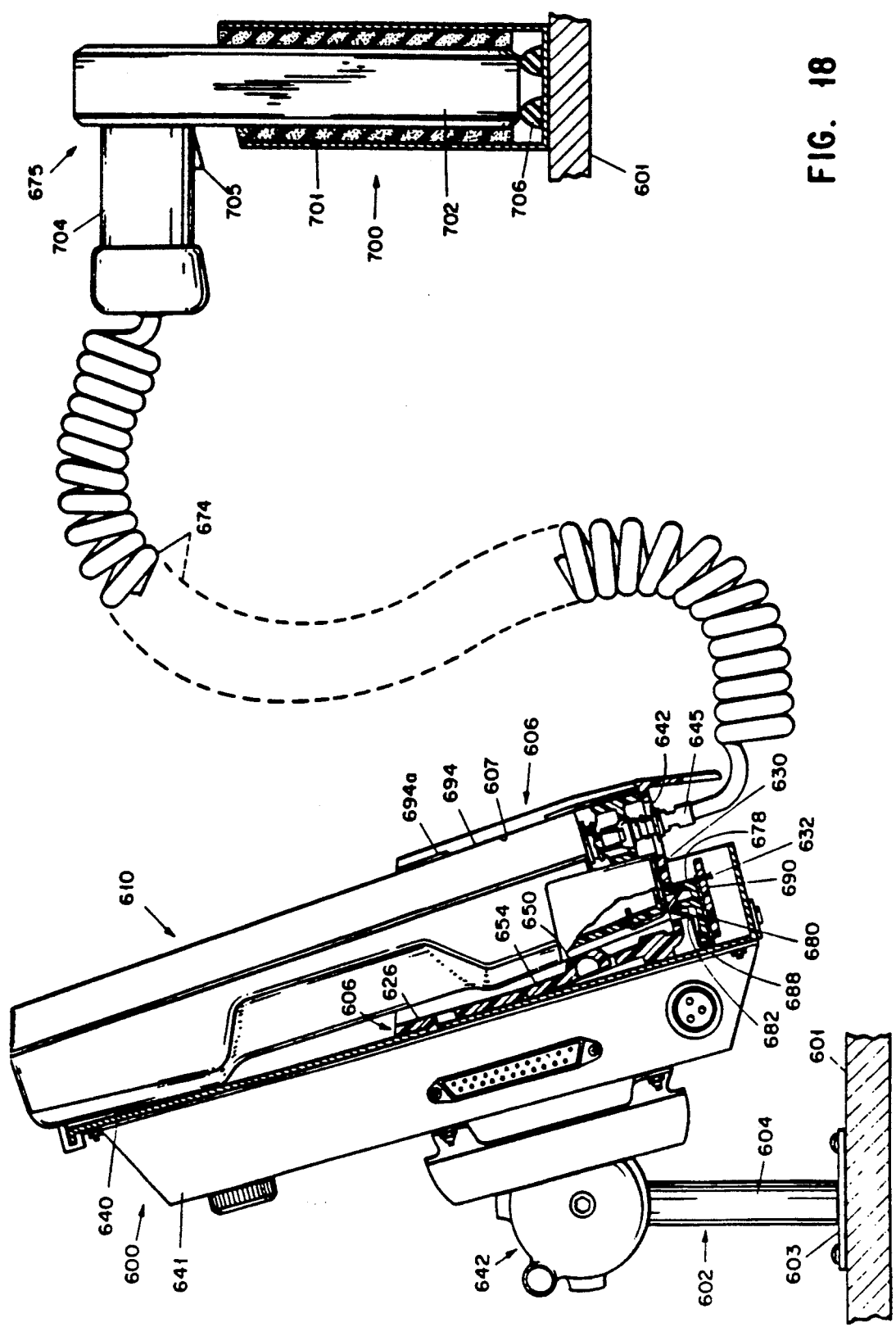
FIG. 18 is a somewhat diagrammatic elevational view of the mounting arrangement of FIG. 17, with portions of the terminal receptacle means and received data terminal broken away and in section to reveal preferred details of construction, and with the reader holster shown in vertical section and having the reader head inserted therein.
Figure 22:
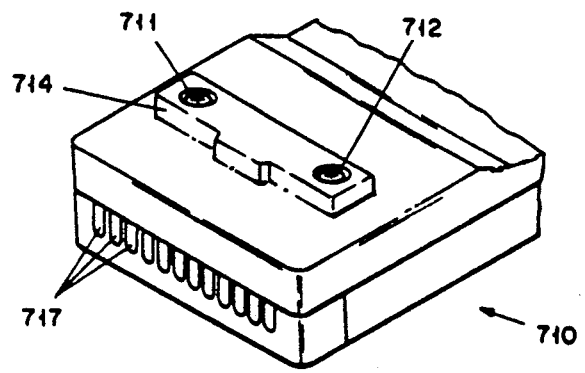
FIG. 22 is a partial perspective view showing details of a hand-held data terminal as shown in FIG. 5.
Figure 23:
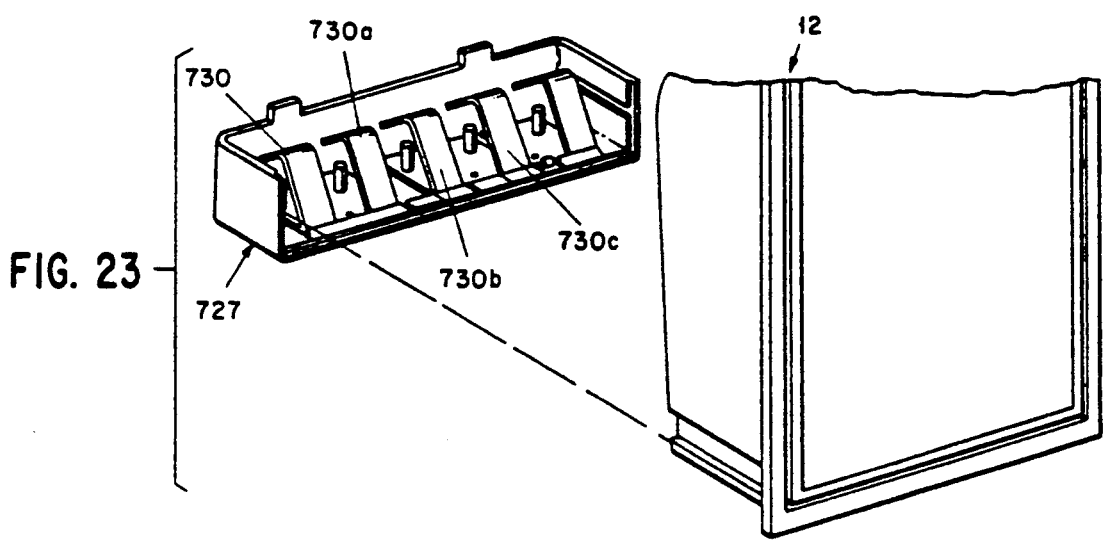
FIG. 23 is a partial, exploded perspective view showing an improved battery compartment hatch (in comparison to that shown in FIG. 2).
Figure 27:
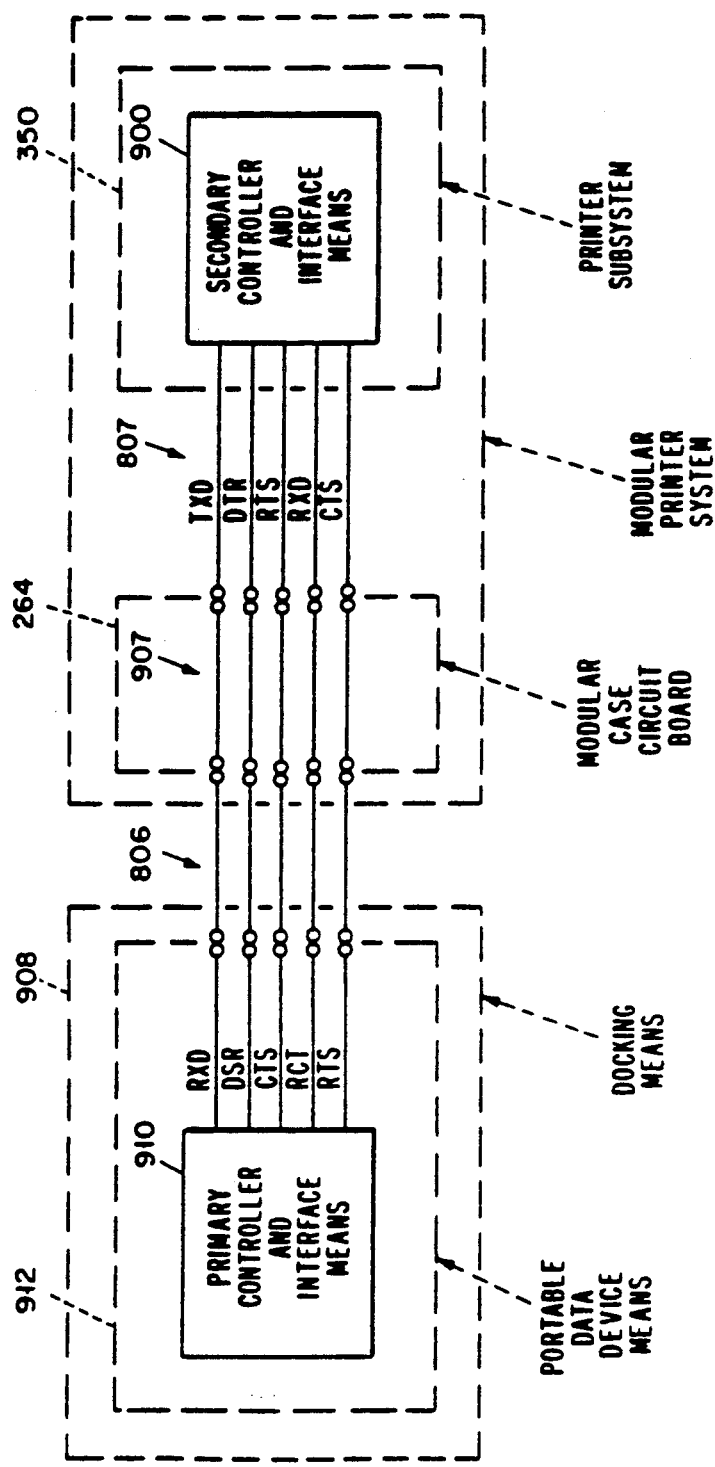

FIG. 27 is a diagrammatic illustration of the data communication system provided by the terminals of FIGS. 1, 2, 3A, 3B, 4, 5 and 22, and of FIGS. 17, 18 and 23, and the printer systems of FIGS. 6-16 and 24 and 25.

FIG. 28 is a somewhat diagrammatic perspective view with a portion of a cradle type receptacle broken away to show internal parts, and illustrating an early concept of a docking system.

FIG. 29 is a somewhat diagrammatic perspective view with a portion of a cradle type docking unit broken away to illustrate leaf spring type contact means for engagement with the terminal external contacts of the terminal of FIGS. 28 and 29.

FIG. 30 is a partial sectional view of a corner of the terminal of FIG. 28 and illustrating further detail of the external contact arrangement.

FIG. 31 is a partial sectional view similar to FIG. 30 but illustrating a modified contact spring configuration.

FIG. 32 is a somewhat diagrammatic bottom plan view of the contact arrangement of the terminal of FIGS. 28 and 29.

FIG. 33 shows a further modification of the external contact configuration for the terminal of FIGS. 28 and 29.

FIG. 34 is a transverse sectional view of a cradle type docking receptacle such as illustrated in FIG. 28, and indicating exemplary details of construction.

FIG. 35 is a somewhat diagrammatic perspective view showing the docking unit contact arrangement separate from the docking cradle type receptacle of FIG. 34.

FIG. 36 is a somewhat diagrammatic vertical sectional view of the cradle type docking unit of FIG. 29 and illustrating details of construction for the docking unit contact arrangement.

DETAILED DESCRIPTION

Figure 1:
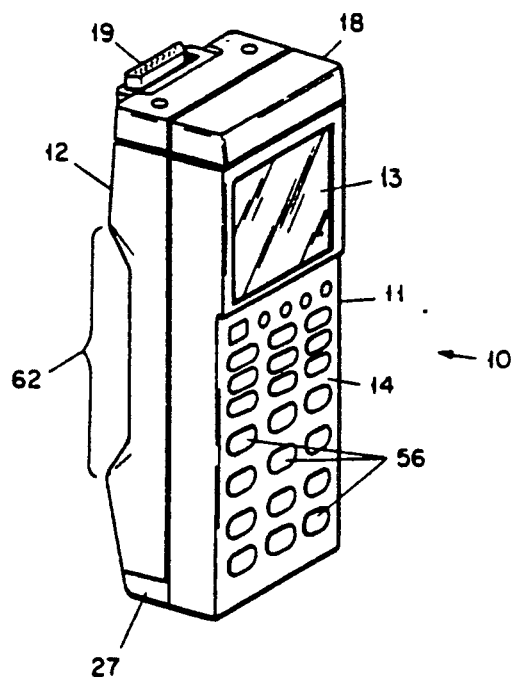
FIG. 1 is a somewhat diagrammatic frontal perspective view showing a hand-held data capture terminal embodying the technologies and teachings of the present invention.

FIG. 1 shows a portable hand-held data capture terminal 10 embodying aspects of the present invention. The terminal 10 has an elongated housing formed of parts 11 and 12, the back housing part 12 of which is formed in a manner to as to enable a user to hold the device comfortably in one hand for extended periods of time. With respect to the contour of housing part 12, reference is made to a copending patent application of George E. Chadima, Jr. and Darald R. Schultz, U.S. Ser. No. 07/104,653 filed Oct. 2, 1987 now abandoned. The disclosure including drawing figures one through fourteen of this copending application is hereby incorporated herein by reference in its entirety.

In the preferred embodiment of the invention, terminal 10 may be powered by a rechargeable nickel-cadmium battery pack 28 (FIG. 5) or a plurality of AA size batteries. Enclosed within the terminal housing 11, 12 are four permanently mounted printed circuit boards 26, 37, 41, and 43, (FIG. 2), namely a host printed circuit board 37, a display printed circuit board 43, a keypad printed circuit board 41, and a memory card controller or peripheral printed circuit board 26. Interconnections between the circuit boards are accomplished through a plurality of pin and socket type connectors including pin type connectors 86 and mating receptacle type connectors 87. An exception is the interconnection between display board 43 and keypad board 41 which is accomplished through a resilient conductive pad 42.

When assembled, front housing part 11 and back housing part 12 are joined together by a plurality of screws 88.

The front housing part 11 of the terminal 10 provides a mounting platform for a display 13 (FIG. 2) which may provide a visual indication of various types of information. In the preferred embodiment of the invention, display 13 is of a liquid crystal display (LCD) variety providing sixteen lines, with twenty characters per line, of display area. Optionally, the display 13 may be of a four line type. The display 13 may be mounted upon a display printed circuit board 43 which is then mounted or secured to front housing part 11 by a plurality of screws 58. In addition, the front housing part 11 may provide a mounting platform for a keypad 14 (FIG. 1), having a plurality of keys 56 thereon. In the preferred embodiment of the invention, keypad 14 is provided with either twenty-three or forty keys. The control and interface circuitry for keypad 14 may be contained on keypad printed circuit board 41 (FIG. 2) which is mounted or secured to front housing part 11 by a plurality of screws 59.

Electrical interconnections between the display printed circuit board 43 and keypad printed circuit board 41 may be accomplished through a resilient, conductive pad 42, which may be located between overlapping portions of the aforementioned circuit boards and retained in this location by means of the pressure exerted upon it when the respective circuit boards are mounted in the terminal 10. Conductive pad 42 may contain a plurality of generally parallel, spaced apart conductive elements embedded within it. The overlapping portions of display printed circuit board 43 and keypad printed circuit board 41 each contain a plurality of coplanar, generally parallel, and evenly spaced apart connector elements 60 and 61, respectively. The respective conductive elements of conductive pad 42, when conductive pad 42 is mounted between the overlapping portions of keypad printed circuit board 41 and display printed circuit board 43, are in positive contact with corresponding aligned connector elements 60 and 61, and provide respective paths for the transfer of electrical signals therebetween. Alternatively, the required electrical interconnections between display printed circuit board 43 and keypad printed circuit board 41 may be accomplished through a flexible multi-conductor ribbon type cable.

Figure 5:
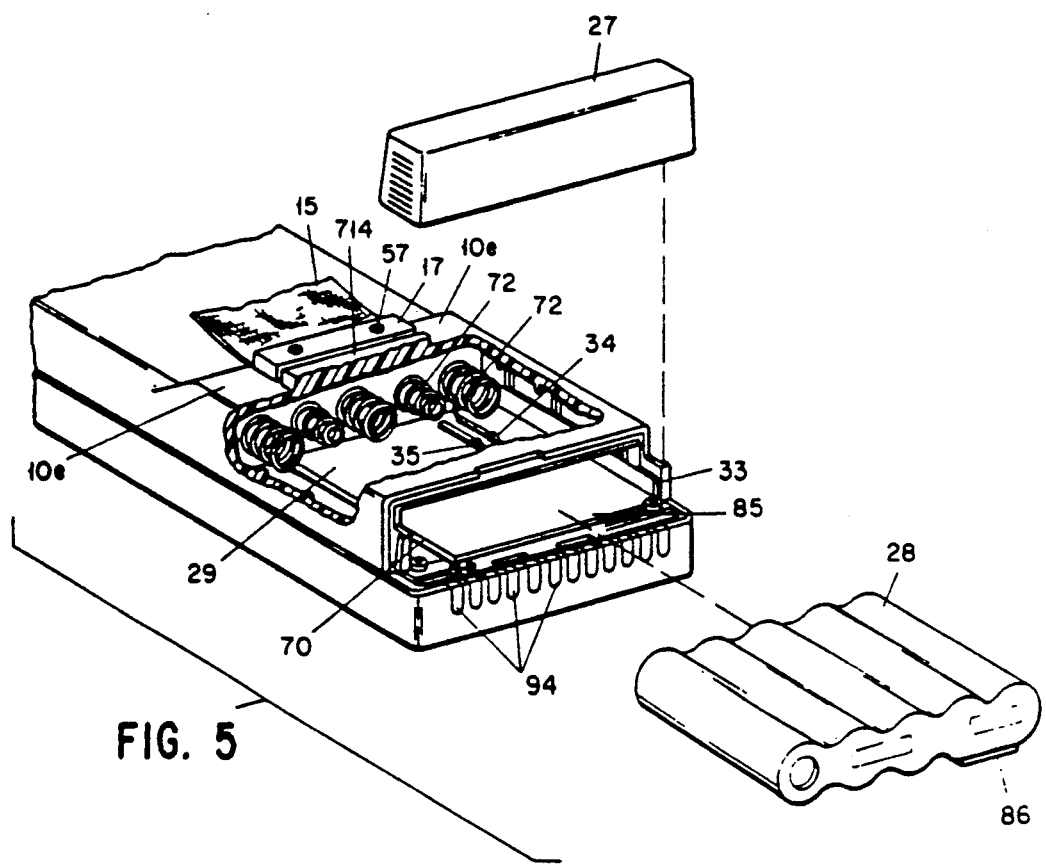
FIG. 5 is a diagrammatic partial perspective illustration of the terminal with a cut-away view of a battery compartment, showing a detached battery end cap and a removed nickel-cadmium battery pack.

The bottom housing part 12 of the terminal 10 may provide a mounting platform for a removable, elastic type flexible strap 15 (FIG. 2). Flexible strap 15 may allow the user of the terminal 10 to relax the user's grip on the terminal 10 for short periods of time, without actually removing the terminal 10 from the user's hand. The flexible strap 15 may be secured to the bottom housing part 12 by means of two retaining clamps 16 (FIG. 2) and 17 (FIG. 5). Retaining clamps 16 and 17 are secured to bottom housing part 12 through the use of screw 57, with two screws 57 securing each retaining clamp. In the preferred embodiment of the invention, retaining clamps 16 and 17 may be removed with simple hand tools, allowing the flexible strap 15 to be easily replaced. Beneath the flexible strap 15 and generally between retaining clamps 16 and 17, bottom housing part 12 is contoured in such a way that, when the terminal 10 is being held by the user, the user's hand is placed on a recessed area 62 (FIG. 1) in bottom housing part 12 and beneath flexible strap 15.

Referring to FIG. 2, the top end of the terminal 10 may be enclosed with a removable end cap 18. End cap 18 is attached with two screws 64 to terminal 10. When installed on terminal 10, end cap 18 overlies and encloses cavity 63. Located on, and part of the end cap 18 may be a multiple pin D-sub type connector 19, which may in turn be direct or hard wired via a flexible multi-conductor ribbon type cable 20 to a connector platform 21, on which may be mounted two connector receptacles 22 and 23. Cable 20, connector platform 21 and connector receptacles 22 and 23 may also be mounted on and be part of end cap 18. The multiple pin D-sub connector 19 may provide a communications port capable of the two-way transfer of data with other compatible devices according to the RS-232C standard as defined by the Electronic Industries Association. When end cap 18 is installed on terminal 10, receptacles 22 and 23 mate with a plurality of pins 67 and 68 which protrude through connector blocks 69 and 70. Pins 67 and 68, and connector blocks 69 and 70 are each attached or connected to memory card controller board 26. In a preferred embodiment of the invention, the end cap 18 may be removable using common hand tools. Alternatively, a type of end cap which does not contain a D-sub connector 19 or any of its associated components 20-23, may be used in place of end cap 18.

Figure 4:
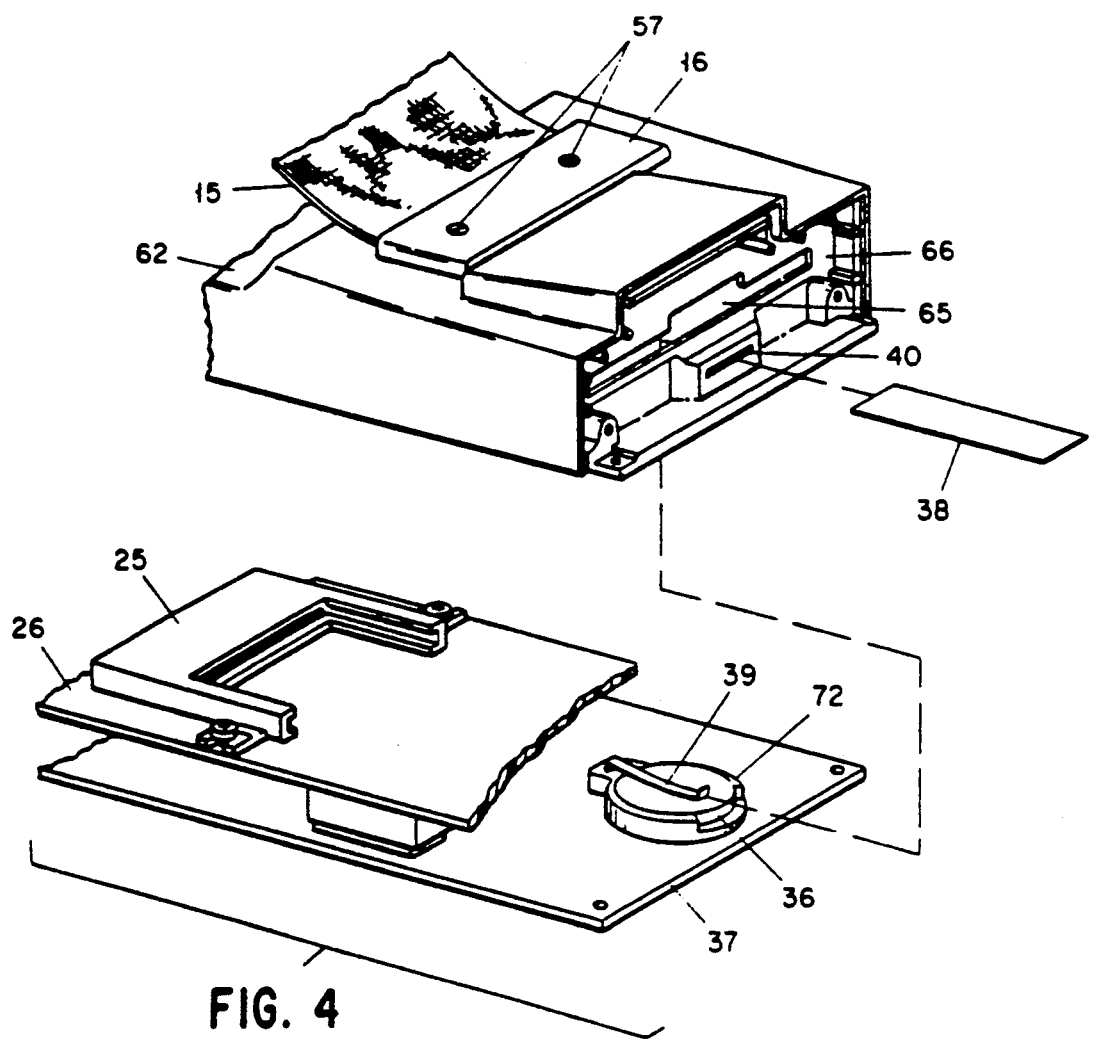
FIG. 4 is a somewhat diagrammatic exploded view of the top end of the terminal showing a peripheral memory card mounting/terminal block and a back-up lithium battery with an associated mylar insulating strip.

Memory card 24 may currently be used to increase the embedded memory of the terminal 10 by up to five hundred-twelve kilobytes of data, and/or may also contain various application programs which may be run on the terminal 10. In a preferred embodiment memory card 24 may contain up to four megabytes of available memory or programming and still be compatible with computer terminal 10. Memory card 24 may be easily installed in or removed from terminal 10 by removal of end cap 18. With end cap 18 removed, memory card 24 may be inserted in or removed from a mounting/electrical contact block 25 (FIG. 4). The mounting/electrical contact block 25 may be mounted on and electrically connected to a peripheral type memory card controller board 26 (FIG. 2). When memory card 24 is installed in mounting/electrical contact block 25, it occupies the area of cavity 63 and extends through an opening 65 in wall 66. Wall 66 is formed when top housing 11 and bottom housing 12 are joined together.

Memory card controller board 26 may contain the electronic components and circuitry necessary to control the operation of memory card 24, as well as to interface the operation of memory card 24 with that of the terminal 10. In addition, memory card controller board 26 provides the electronic circuitry required to interface the two-way data transfer which may occur through D-sub connector 19. In a preferred embodiment, memory card controller board 26 may be a peripheral type device which may be exchanged or otherwise configured with other controller type cards to enable the use of various types of end cap devices. These various end cap devices may enable terminal 10 to perform a wide variety of functions not currently possible with existing hand held data capture devices including, but in no way limited to, the two-way transfer of data through space using radio frequency waves as the data carrying medium, the two-way transfer of data over telephonic communication links, and the two-way transfer of data between the terminal and a bar code reading device.

Referring again to FIG. 2, the bottom end of the computer terminal 10 may be enclosed by a battery compartment hatch 27. This battery compartment hatch 27 may enclose and retain a rechargeable nickel-cadmium type battery pack 28 in a battery compartment or cavity 29 (FIG. 5) located on the terminal 10. Optionally, a plurality of AA size batteries which provide the required power may be used in place of nickel-cadmium battery pack 28. In the preferred embodiment of the invention, the battery compartment hatch 27 may have attached to its surface a plurality of conductive metallic type contacts 30. Metallic contacts 30, in conjunction with a plurality of metallic springs 72 located in the battery compartment 29, may complete the electrical path of the batteries enclosed in the battery compartment 29. When the battery compartment hatch 27 is properly installed on the terminal 10, it comes in contact with a conductive metallic rod 70 (FIG. 5) which extends the length of the battery compartment and is hard wired to battery supply connector 71, and completes the ground or negative potential path for the batteries. The enclosed batteries are arranged in battery compartment 29 in a series type configuration to provide the required voltage. The positive potential of the battery path is completed by the hard wiring of a metallic spring 72 to battery supply connector 71. Battery supply connector 71 contains a plurality of receptacles which mate with host board 37 to provide the battery power to the terminal 10. Battery compartment hatch 27 attaches to the bottom housing part 12 of terminal 10 through the interlocking and meshing of identical but opposite railings on both the battery compartment hatch 27 and bottom housing part 12. Battery compartment 29 is formed by a cavity within terminal 10, with a somewhat rectangular opening 85 on which three corners are rounded and one corner is somewhat squared. Battery compartment 29 is formed in terminal 10 on bottom housing part 12 when battery compartment cover 33 (FIG. 2) is attached thereon.

Battery pack 28 may be constructed of a plurality of nickel-cadmium battery cells, arranged in such a way as to provide approximately six volts of direct current electrical power. In addition, battery pack 28 may contain a formed metallic plate 31 which may be attached to the nickel-cadmium batteries in such a way as to form a somewhat squared edge on one corner 86 of the battery pack 28. The somewhat squared corner 86 (FIG. 2) of the battery pack 28 may correspond with the previously described somewhat squared corner on the rectangular opening 85 (FIG. 5) of battery compartment 29, and may prevent the improper insertion of battery pack 28 in battery compartment 29. In addition, metallic plate 31 may be further formed to create a conductive metallic shunt 32 (FIG. 2). When battery pack 28 is installed in computer terminal 10, metallic shunt 32 engages probes 34 and 35 (FIG. 5) to create an electrically conductive path or short circuit between the probes 34 and 35. Probes 34 and 35 may form part of the battery charging circuit of the terminal 10 and may disable this circuit when not electrically shorted together, thereby preventing the inadvertent and possibly hazardous application of recharging electrical power to non-rechargeable (e.g. alkaline) batteries.

Referring to FIG. 4, a lithium type battery 36 may be mounted upon a host printed circuit board 37 (FIG. 2) and retained in position by a non-conductive type of mounting pod 72. When installed, battery 36 may provide stand-by electrical power to ensure any data stored in the memory circuits is retained should the primary power supply drop below a predetermined level, and may further maintain the operation and memory of an integrated circuit type of real-time clock during the same conditions. The lithium battery 36 may be provided with a electrically non-conductive (e.g. mylar) strip 38 which, when installed between the battery 36 and an electrically conductive battery retaining clip 39, may prevent activation of the stand-by battery power during the aforementioned conditions until such a time as the non-conductive strip 38 is removed by the user. For ease of removal, non-conductive strip 38 may protrude through an opening 40, which may be located on the top end of computer terminal 10 and under the end cap 18 which may be attached thereto.

Electrostatic discharge (ESD) protection may be provided exclusively through circuit techniques and board mounted devices arranged in such a manner as to protect the entire electronic circuitry of terminal 10 from the potentially harmful effects of transient signal phenomena, including that introduced to the terminal 10 through any external connectors. The elimination of shielding devices commonly used to provide protection from said transient signal phenomena on previous types of portable data capture terminals may enable lighter, molded polymeric materials to be used in the manufacturing process of certain components.

DESCRIPTION OF FIG. 3A

Referring to FIG. 3A, unique battery charging and terminal sleep mode circuits are illustrated. The battery charging circuit may be enabled only when rechargeable battery pack 28, capable of making a short circuit between the metallic probes 34 and 35 (FIG. 5) is properly installed in the battery compartment 29 as previously described. When terminal 10 is attached or otherwise connected to a compatible recharging device, a charging voltage may be introduced on the CHRGX line (FIG. 3A). The charging voltage on CHRGX line 43 may then be applied to a voltage regulating device 44 e.g. type LP 2951 ACM. The regulated charging voltage output of regulating device 44 may be applied to a transistor switch 45 through a resistor R73. Transistor switch 45 may be software controlled, and may be activated or turned on when the signal on CHGON line 46 changes its logical state, which may cause field effect transistor 47 to change state which then may cause transistor switch 45 to change state. Transistor switch 45 may provide a constant charging current through a diode CR3, to the installed battery pack 28, for a predetermined length of time. The charging current may be applied to installed battery pack 28 through the shorted metallic terminals 34 and 35. Metallic probe 35 (FIG. 5) corresponds to the CHRGOUT line 48 (FIG. 3A) and metallic probe 34 (FIG. 5) corresponds to the BATT IN line 49 (FIG. 3A).

The sleep mode circuitry of terminal 10 monitors the input activity of the terminal 10 and, when no activity is detected for a predetermined length of time, may cause the terminal 10 to shift to a stand-by or sleep mode to conserve the power supplied by the installed batteries. When in the inactive state, the memory array and real time clock circuits of terminal 10 require less power than when in an active state. In operation, when the terminal 10 has been inactive (e.g. no keys 56 are pressed on keypad 14) for a predetermined amount of time, $\overline{\text{MEMON}}$ line 50 may pulse. This pulse may be sensed on the CLK input of flip-flop integrated circuit 51, which may cause its $\overline{Q}$ output to switch levels. Resistor R140 and capacitor C96 may ensure that no false signals are received by flip-flop 51. The Q output of flip-flop 51 is designated $\overline{\text{MEMSW}}$ line 52. The state of $\overline{\text{MEMSW}}$ line 52 may cause field effect transistor 53 to change state. $\overline{\text{MEMSW}}$ line 52 may be filtered by resistor R88 and capacitor C93. When field effect transistor 53 changes states, it greatly reduces the amount of current flowing through the base of transistor 54 by causing resistor R59 to be placed in series with resistor R60. The greatly reduced current flow through the base of transistor 54 allows the regulated supply of the terminal 10, provided by the power of the installed batteries applied through a voltage regulating device, to provide less current, thus increasing the active life of the installed batteries.

when terminal 10 again becomes active (e.g. a key 56 is depressed on keypad 14) $\overline{\text{NMI}}$ line 55 may pulse. The pulse on $\overline{\text{NMI}}$ line 55 may be sensed by flip-flop 51, FIG. 3A, at its CLR input, and may then cause the Q output of flip-flop 51 to change state. The state of $\overline{\text{MEMSW}}$ line 52, FIG. 3A, at the Q output of flip-flop 51 may now cause field effect transistor 53 to reset to its former state, returning current flow through the base of transistor 54 to its active level.

The terminal 10 may operate exclusively from the power supplied through a regulating device by the installed batteries (e.g. battery pack 28, FIG. 2) until the $\overline{\text{MEMDIS}}$ line 83, FIG. 3A, changes state. The $\overline{\text{MEMDIS}}$ line may change state when the installed batteries or attached charger do not provide sufficient voltage to operate the terminal. When the $\overline{\text{MEMDIS}}$ line changes state, it may change the state of field effect transistor, Q15. The $\overline{\text{MEMDIS}}$ line may be filtered by resistor R141 and capacitor C94. When field effect transistor Q15 changes state it may cause interruption of current flow through the base of transistor 54, effectively removing the regulated supply of terminal 10 from the memory array. When this occurs, standby lithium battery 36 (FIG. 4) or a charged capacitor may supply the memory array and real time clock circuits until such time that the main power supply is returned to the level required to power the terminal 10. A charged capacitor may provide short term back-up power for the terminal 10, with the lithium battery 36 providing power when the stored charge of the capacitor is depleted. Lithium battery 36 may provide long term back-up power. When the main power of terminal 10 is restored to an operational level, the $\overline{\text{MEMDIS}}$ line, FIG. 3A, may return to its former state which may restore normal current flow through the base of transistor 54.

DESCRIPTION OF FIG. 3B

Figure 3B:
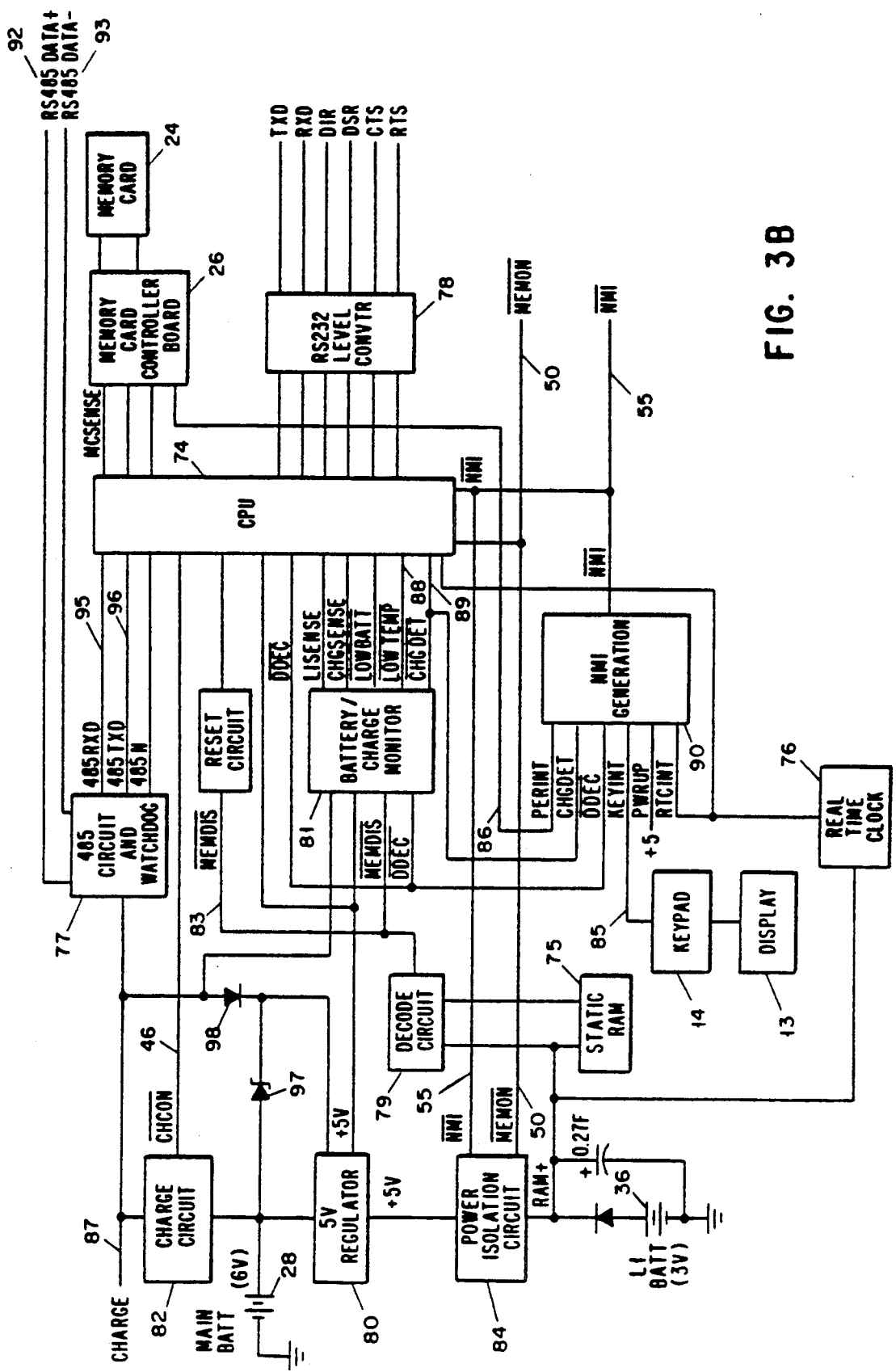

Referring now to FIG. 3B, the terminal functional block diagram is illustrated.

A central processor unit (CPU) 74 may contain program storage and reside on the host printed circuit board. CPU 74 controls all terminal functions, executes machine instructions in proper sequence, and supervises data communication with devices inside and outside the terminal 10. However, it may allow an optional auxiliary processor unit on the memory card controller board 26 to control some external access (e.g. reading from and/or writing to a memory card 24). The CPU 74 may abort all communications throughout terminal 10 should power available from the main batteries (e.g. nickel-cadmium battery pack 28) drop below a predetermined level. All access to static RAM 75, the real time clock 76, the keypad 14 and keypad circuit board 41, and display 13 and display circuit board 43 are accomplished through CPU 74. The CPU 74 also controls the charging current applied to battery pack 28 by control of $\overline{\text{CHGON}}$ line 46 (FIG. 3A) and generates a signal on $\overline{\text{MEMON}}$ line 50 to initiate the sleep mode described earlier. In addition, CPU 74 allows activation of the 485 circuit and watchdog timer component 77, RS232 level converter 78, and the backlight of display 13.

The memory in static RAM 75 is decoded in the decode circuit 79. $\overline{\text{MEMDIS}}$ line 83 is coupled with this circuit and will inhibit access to static RAM 75 in the event the five volt regulator 80 has dropped out of regulation, indicating the installed batteries (e.g. nickel-cadmium battery pack 28) are no longer providing the necessary voltage. In the preferred embodiment of the invention, memory in the static RAM 75 may be selectively configured in one of varying sizes.

The terminal 10 may be equipped with a battery/charge monitor circuit 81 as well as a battery charge circuit 82. The battery/charge monitor circuit 81 monitors the main battery and provides a signal on the $\overline{\text{LOWBATT}}$ line if battery voltage drops below a certain value. The signal on the $\overline{\text{LOWBATT}}$ line informs the CPU 74 that battery power is getting low, and CPU 74 in turn will notify the user through the display 13. The terminal 10 will continue to operate normally as long as the $\overline{\text{LOWBATT}}$ line remains in a high logical state. If the $\overline{\text{LOWBATT}}$ line goes low, the terminal 10 will switch to its inactive (sleep) state, but will be allowed to become active if a key 56 (FIG. 1) is pressed. A further output of the monitor component 81 is the $\overline{\text{DDEC}}$ line. The $\overline{\text{DDEC}}$ line provides a true indication if the five volt regulator 80 begins to drop out of regulation. When the $\overline{\text{DDEC}}$ line goes low, the terminal 10 switches to sleep mode promptly, saving all data in the static RAM 75, which will have backup power in the event that the main batteries are removed. Finally, when the output of the main batteries (through 5 volt regulator 80) drops to a predefined level, the $\overline{\text{MEMDIS}}$ line 83 will carry a low logical signal, causing the static RAM 75 to be disabled, the CPU 74 to be reset and the transistor 54 (FIG. 3A), located in the power isolation circuit 84, to switch to nonconducting mode. The CPU 74 is equipped with an analog input port which allows it to monitor several other battery/charge conditions. The signals available at this port may provide information regarding the charge level, the voltage level of any power source in an inserted memory card 24. Other signals which may be monitored here are an extended duration signal emanating from the KEYINT line 85. The memory card controller board 26 may also provide an interrupt signal on PERINT line 86, which is made available to the CPU 74 on this analog port.

The charge circuit 82 is disabled unless a shorting mechanism (conductive metallic plate 32, FIG. 2) which is located on and part of the nickel-cadmium battery pack 28, is present and properly installed in the battery compartment 29 (FIG. 5) as described previously. Charging of an installed nickel-cadmium battery pack 28 occurs automatically when a charge voltage of a predetermined valve is present on CHARGE line 87. Charging of the installed nickel-cadmium battery pack 28 may occur selectively at a rate of approximately twenty milliamps or a rate of approximately seventy-five milliamps, and is determined by the terminal software through CPU 74. The CPU 74 also monitors the ambient air temperature and, if below a predetermined level, preferably approximately five degrees Centigrade, the CPU 74 cause the $\overline{\text{LOWTEMP}}$ line 88 to provide a signal, which causes constant current charge to default to the lower charge (20 milliamps) rate. When terminal 10 is first attached or otherwise connected to a charger, the $\overline{\text{CHGDET}}$ line 89 goes active for approximately four milliseconds, then returns to its inactive state. This causes NMI generator 90 to generate a pulse to wake the terminal 10 from its sleep mode and signal that a charger is present.

A charger must be attached to terminal 10 for the 485 circuit and watchdog component 77 to function, as this circuit is powered by the charger. The 485 circuit and watchdog circuitry 77 may provide the terminal 10 with a communications port capable of synchronous two-way data communication with other compatible devices, transferring data at a rate not greater than five hundred thousand bits per second, according to the predominate RS485 standard as defined by the Electronic Industries Association. When CPU 74 detects the presence of a charger, it activates the 485 circuit and watchdog through 485ON line 91. Data may then be transmitted and received by terminal 10 on RS485 DATA+ line 92 and RS485 DATA- line 93, these lines being connected to a pair of a number of coplanar, generally parallel and evenly spaced conductive metallic pads 94 (FIG. 5). Received data is applied to the CPU 74 from the 485 circuit and watchdog circuit 77 on 485RXD line 95, while transmitted data is applied to the 485 circuit and watchdog circuit 77, from CPU 74, on 485TXD line 96.

Five volt regulator 80 may operate from either the main battery supply or an attached charger. If both are present, the output voltage of the charger will be higher than the battery voltage, causing five volt regulator 80 to choose current from the charger supply rather than the batteries. This is accomplished through "OR" wiring of diodes 97 and 98.

Terminal 10 has been designed to be in an inactive state (sleep mode) for the majority of time to conserve battery power. As described previously, $\overline{\text{NMI}}$ line 55 must be pulsed for terminal 10 to wake up and begin program execution. The pulse on $\overline{\text{NMI}}$ line 55 is generated by the NMI generator 90 and may be generated by a pulse on KEYINT line from the keypad 14, a pulse on RTCINT line from the real time clock 76, simultaneous pulses on $\overline{\text{LOWBATT}}$ line and $\overline{\text{DDEC}}$ line, a pulse on $\overline{\text{CHGDET}}$ line 89, a pulse on PERINT line 86 from memory card controller board 26, or a pulse on the PWRUP line (from the 5V regulator 80).

Power is applied to the memory card controller board 26 under the control of CPU 74. Once the memory card controller board 26 power is stable and the memory controller board microprocessor is stable, the memory card controller board microprocessor begins a unique sequence of hand shaking with CPU 74 to establish a communication link. This link has some software support to monitor date integrity throughout the transfer of data. The memory card controller board 26 is equipped with a pair of analog switches which isolate the data bus on the memory card controller board 26 from the memory data bus on the host printed circuit board 37. This isolation prevents inadvertent data bus interference during the power up routine of the memory card controller board microprocessor. The memory card controller board microprocessor controls all address and data bus generation required to access memory card 24. The power to the memory card 24 is enabled by a sequenced combination of signals both from the CPU of the host board 37 and the microprocessor of the memory card controller board 26. When power to memory card 24 is off, the contents of the random access memory (RAM) of memory card 24 may be maintained by a lithium battery located on a part of memory card 24, unless a charger is attached to terminal 10, in which case power for memory card 24 will be supplied by the charger.

With respect to FIGS. 1, 2, 3A, 3B, 4 and 5 hereof, reference is made to a copending application of Mssrs. Cargin, Jr., Kelly, Fischer, Gibbs, Boatwright and Durbin, entitled "HAND-HELD COMPUTER TERMINAL", U.S. Ser. No. 07/339,330 filed Apr. 14, 1989, now abandoned, which is directed to various features of the terminal per se. The disclosure of this copending application including its drawing figures one through six is hereby incorporated herein by reference in its entirety.

The following FIGS. 6 through 16 show a modular printing system which may be adapted to connect with either the connector 19 of FIGS. 1 and 2, or the external contact pads 94, FIG. 5. Certain aspects of the modular printer system are described and claimed in a copending application of George E. Chadima, Jr. and Darald R. Schultz entitled "MODULAR PRINTER SYSTEM" U.S. Ser. No. 07/227,195 filed Aug. 2, 1988, now abandoned. The disclosure of this copending application Ser. No. 07/227,195 including its drawing figures one through sixteen is hereby incorporated herein by reference in its entirety.

DESCRIPTION OF FIGS. 6–16

Figure 6:
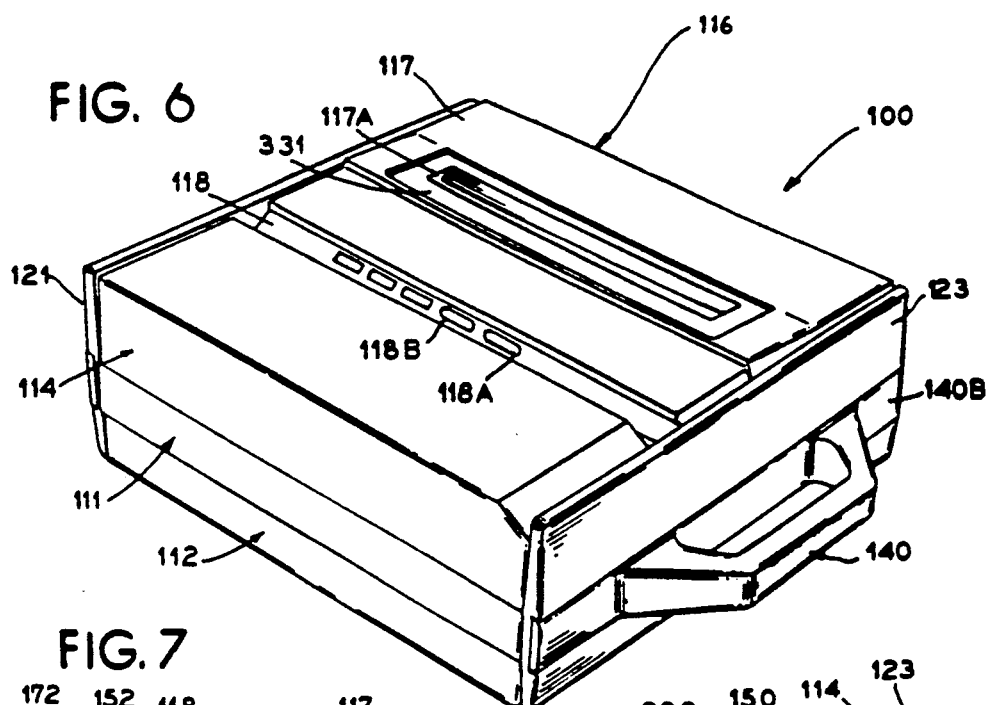
FIG. 6 is a somewhat diagrammatic perspective view showing a modular printer system configured as a unitary portable device and embodying teachings and concepts of the present invention, and which may be adapted to receive the terminal of FIGS. 1,2,3A,3B, 4 and 5, and cooperate therewith to provide a hard copy print out of data supplied by the terminal.

FIG. 6 is a perspective view illustrating a commercial version of a portable modular printer device 100 in accordance with the present invention. As in the previous embodiment, the device comprises a standardized open frame module 111 which receives a terminal module 114 and a printer module 116. In this embodiment a printer cover 117 has a paper outlet slot 117A. A control panel 118 may include actuating regions such as "Advance Page" actuator 118A and a "Set Top of Page" actuator 118B.

The open frame 111 may have a configuration similar to that of frame 11 of FIG. 2, and in each embodiment the frame may be of integral unitary construction and of structural plastic material (e.g. Noryl FN-215) so as to provide the desired strength and rigidity with a minimum weight of material. Left and right frame elements 121 and 123 have upper and lower flange portions similar to flanges 21A, 21B, FIG. 2, which protectively embrace terminal module 114, printer module 116 and paper tray module 112.

Figure 7:
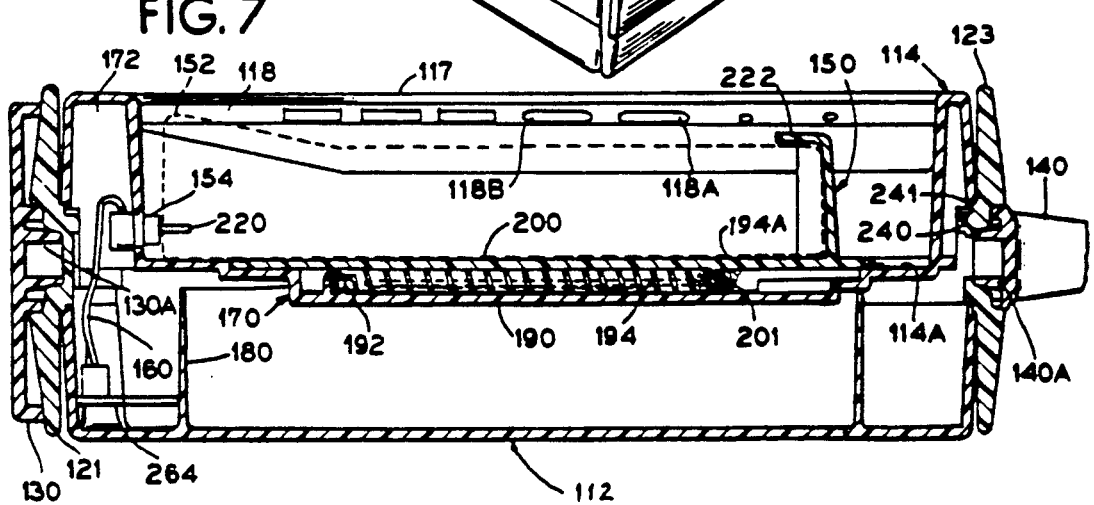
FIG. 7 is a somewhat diagrammatic transverse sectional view of the embodiment of FIG. 6 and showing internal construction at the terminal module of the portable device.

As best seen in FIG. 7, frame elements 121 and 123 have central grooves which are shown as receiving an interior rib structure 130A of a foot member 130 and a base rib structure 140A of a handle member 140. Threaded fastening elements such as indicated at 141 and 142 in FIG. 8 may secure members 130 and 140 with the frame 111. As seen FIG. 6, a base 140B of handle member 140 may extend for the entire length of frame element 123 so as to completely cover the central groove therein.

As shown in FIG. 7, terminal module 114 has an elongated recess 114A accommodating reciprocal movement of a terminal retainer bracket 150. A handheld terminal corresponding to terminal 30 FIG. 2, is indicated in dash outline at 152, FIG. 7, in coupled relationship to the terminal module 114. The terminal 152 is disengaged from the terminal module by sliding the retainer bracket 150 to the right as seen in FIG. 7, against the action of a spring means located in a bottom portion of the terminal module 114. The spring means acts on the bracket 150 with sufficient force to insure interengagement of a socket of the terminal 152 with a plug type connector 154 associated with the terminal module 114. Connector 154 is connected with the electric circuitry of the printer device 100 by means of a cable indicated at 160. As previously described, connector 154 and cable 160 provide for data communication between the terminal indicated at 152 and a printer unit associated with printer module 116.

As seen in FIG. 7, terminal module 114 is comprised of a terminal holder base 170 of molded plastic construction (e.g. Cycolac KJW, Borg Warner). The base 170 may be threadedly secured to bosses integral with the underlying frame elements corresponding elements 24 and 25, FIG. 2. The base 170 is provided with a double wall configuration at its opposite longitudinal ends such that the cable 160 may extend within an enclosed chamber 172.

Figure 8:
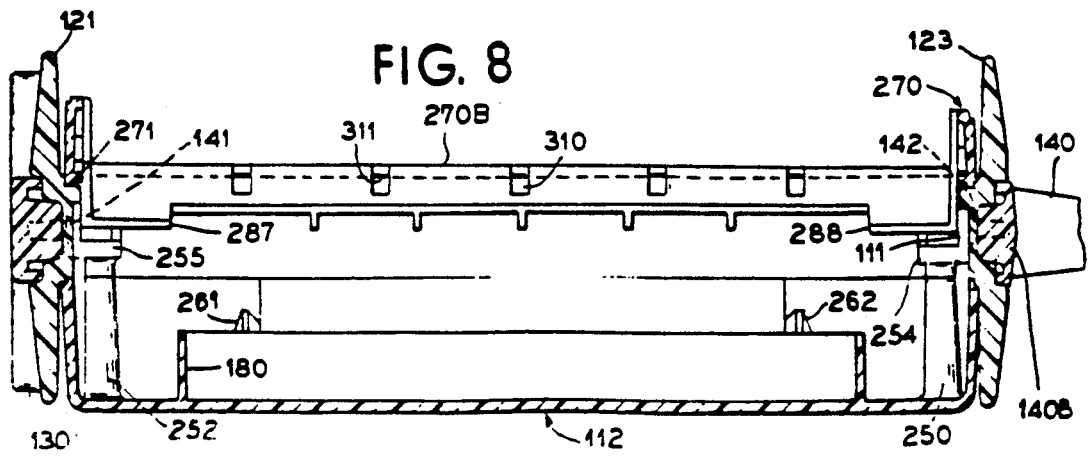
FIG. 8 is a somewhat diagrammatic transverse sectional view of the embodiment of FIG. 6 and showing the printer case and other internal parts at a rear printer module receiving portion of the portable version of FIGS. 6 and 7, the printer cover, and printer module having been removed from the printer case to reveal the rear wall of the printer case.
Figure 15:
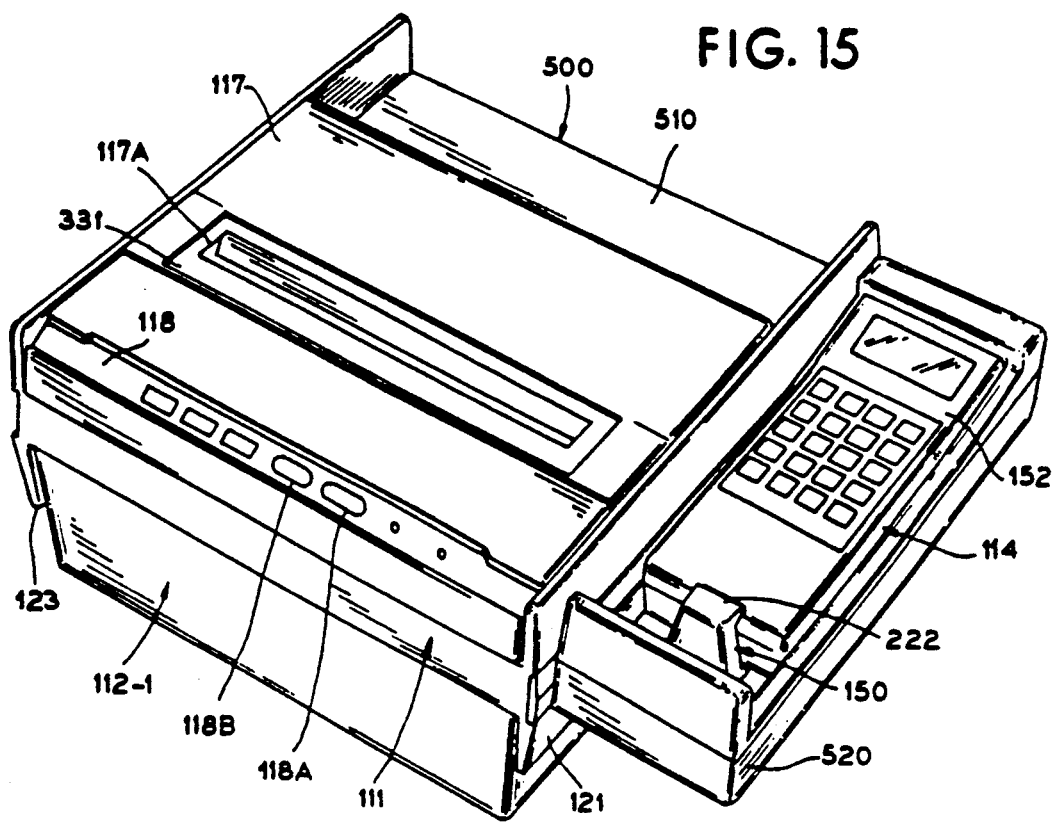

As shown in FIG. 8, paper tray module 112 of the portable device 100 may be provided with a fifty sheet paper bin 180 for holding a supply of paper which is to be automatically fed into the printer mechanism. The paper tray 112-1 shown in FIG. 16 is equipped with a larger paper bin 180-1 capable of holding 200 sheets for automatic feed into a printer mechanism. The larger capacity paper tray module 112-1 is normally associated with a non-portable device such as shown in FIGS. 15 and 16. The paper tray modules 112 and 112-1 may be identical except for the difference in capacity of the paper bins.

As diagrammatically indicated in FIGS. 7, 9 and 10, terminal holder base 170 may have an integral depressed central bottom 190 (FIG. 7) with two integral upstanding bosses 191, 192 (FIG. 9) serving to secure the ends of a tension spring indicated diagrammatically at 194. The bracket 150 includes an integral slider piece 200 with an integral depending lug 201 about which a mid region 194A of spring 194 may extend.

As best seen in FIG. 10, slider piece 200 may have integral depending legs with outturned feet such as 211 which interengage with ledge parts such as 215 which are integral with the terminal holder base 170. The upper edges of the ledge parts such as 215 are chamfered, e.g. over a distance of 0.040 inch at forty-five degrees, at their inner edges so that the feet such as 211 will be cammed inwardly as the sliding retainer bracket 150 is pressed downwardly during assembly with the terminal holder base 170. The legs 211 snap into interengagement with ledges such as 215 to hold the parts assembled relation while accommodating longitudinal sliding motion of the retainer bracket 150.

As seen in FIGS. 7, 9 and 10, the connector 154 has an associated alignment pin 220 which engages in a receiving socket on the terminal 152 and assures reliable interengagement of the connector pins and sockets in spite of manufacturing tolerances. The depressed bottom 190 of the terminal holder base provides a clearance space 221, FIG. 9, into which the slider piece 200 moves to accommodate insertion of one end of the computer terminal 152, FIG. 7, under lip 222 of the retainer bracket 150, and to allow the opposite end of the terminal 152 to be lowered into engageable alignment with the pin 220, after which the bracket 150 is allowed to move to the left (as viewed in FIG. 7) until the terminal 152 is interengaged with connector 154 in readiness for a data transfer operation.

In an embodiment actually constructed, the ledges such as 215 had a length of about 5.4 inches, and the outturned feet such as 211 had a length of about four inches. The length of the slider piece 200 was about 9.1 inches while its slideway including clearance space 221 was about 10.2 inches, the slider piece 200 being longitudinally shiftable over a distance of about one inch against the action of spring 194.

To fasten the terminal module 114 with the open frame 11, the open frame is provided with four integral tabs such as 231, FIG. 10, having internally threaded sleeves for receiving screws such as 232, FIGS. 9 and 10.

As can be seen in FIGS. 7 and 10, a sealing strip 240 extends about the perimeter of the two openings in the frame 111 with a downturned integral edge 241 of the terminal module 114 being held in sealing relation against the seal strip 240 continuously about the perimeter of the terminal module.

Referring to FIGS. 8 and 10, the paper tray module 180 has bosses such as 250 (FIG. 8), 251 (FIG. 10) and 252 (FIGS. 8 and 10) at respective corners which receiver screws such as 253, FIG. 10, threadedly engaged with the frame 111. In particular, the frame has integral corner tabs such as 254 (FIG. 8), 255 (FIGS. 8 and 10) and 256 (FIG. 10) with internally threaded sleeves for receiving the screws such as 253.

As seen in FIG. 9, the paper tray module includes a pair of integral retaining fingers 261, 262 for receiving a battery pack 263 for use during portable operation. A printed circuit board 264, FIG. 7, occupying a left marginal region of the paper tray 112 may have a plug-in type receptacle thereon adjacent finger 261, FIG. 9, for receiving input direct current operating power from the battery pack.

In the illustrated embodiment the control panel 118 includes an apertured structural member 270A which is an integral part of a one-piece printer case 270 of plastic material (e.g. Cycolac KJW, Borg Warner). The case is of generally open rectangular configuration and overlies four elements of the frame 111 (corresponding to frame elements 21, 22, 23, 25, FIG. 2). The case 270 includes a rectangular perimeter 271, FIG. 10, which continuously sealingly engages the sealing strip 240.

The frame 111 includes an integral crosspiece 280, FIG. 10, with integral tab portions such as 281, FIG. 10, having threaded sleeves to which overlying flanges such as 282 (FIGS. 9 and 10) and 283 (FIG. 9) of the printer case 270 are secured by means of screws such as 284. Corner tabs 254 and 255, FIG. 8, of the frame 111 are threadably engaged with corner flange parts 287 (FIGS. 8-10) and 288 (FIG. 8 and 9) as indicated by screw 291, FIGS. 9 and 10.

The printer case 270 is provided with integral inwardly projecting ribs at opposite sides thereof which define printer module mounting means 301, 302, FIGS. 9 and 10. The purpose of mounting means 301, 302 is explained in detail hereafter in reference to FIG. 11. As seen in FIG. 10, each of the mounting means includes a vertical guide channel such as 301A connecting with an arcuate guide channel such as 301B.

As seen in FIG. 8, a rear wall element 270B of the printer case 270 has a series of five notches leaving exposed ledges such as 311 which interengage with hook parts integral with vertical ribs such as 312, FIG. 10. This provides for a hinged coupling of the rear wall 117B of cover 11 with the rear wall 270B of the printer case, the frontal edge of cover 117 having a series of cam hooks such as 314 which can be snapped into engagement with an edge 315 of the printer case 270. When the cover 117 is opened, it can be completely removed by pulling the integral hooks of ribs 312 forwardly out of the notches 310.

The rear wall element 270B, FIG. 10, has a sealing strip 320 secured thereon which engages with a lower edge of cover wall 117B when the cover 117 is in closed position. The cover 117 has a further sealing strip 321 which together with sealing strip 320 extends along the entire closure perimeter of the cover 117. A clear soft plastic strip 330 may be secured in a recess 331, FIG. 6, e.g. by means of adhesive at 332, FIG. 10, so that a flap 330A of strip 330 normally covers the paper outlet slot 117A while still allowing paper to be fed therefrom during printing operation.

FIG. 11 shows a printer module 350 interengaged with the printer case 270. In particular the printer module is provided with a generally U-shaped pivot frame 351 of pressed metal which adapts various commercially available printer mechanisms such as 352 to the printer case 270.

The pivot frame 351 has upstanding lateral flanges such as 351A each of which carries a pivot shaft with a disk 355 which fits into a conforming receiving slot such as indicated at 356, FIG. 10, of the printer module mounting means 301, 302, FIG. 9. A limit pin 360, FIG. 11, of each pivot frame lateral flange is of lesser diameter than disk 355 so as to be freely movable in the vertical channel 301A and in the arcuate channel 301B, FIG. 10.

The pivot frame 351 of the printer module 350 is further provided with a pair of longitudinally directly flanges such as 351B which carry rotary latch mechanisms 361. The latch mechanisms each include a sleeve 362 which has an extended position as indicated in dot dash outline at 362-1 and which is shiftable against the action of a compression spring 364 as the printer module pivots clockwise as shown in FIG. 11 from the inactive position 350-1 to the position shown in solid lines at 350. As the sleeve 362 retracts a bar-shaped lug 366 moves through a conforming elongated slot such as 367 in a tab such as 288, FIG. 9. When lug 366 reaches a position below the tab 288, a camming action between sleeve 362 and the lug stem may cause the lug 366 to rotate slightly and interlock with the tab. To release the lug 366, the printer module is rocked slightly in the clockwise direction against the action of spring 364, whereupon the lug 366 is realigned with its slot 367 to allow counterclockwise pivotal movement of the printer module to position 350-1.

The pivot frame 350 further includes a central curved extension 351C disposed between the longitudinal flanges 351B and providing a smooth paper guide face 370 which forms part of a paper feed path 371. When the printer module is pivoted to position 350-1, the paper path may be extended as indicated at 371-1.

FIGS. 12-14 show an AC adapter module 400 which is readily applied to the portable version of FIGS. 6-11 in place of foot member 130. For this purpose, the module 400 is provided with internally threaded sleeves at 401-403 so as to be aligned with respective apertures such as that receiving screw 141, FIG. 8. The frame module of FIGS. 13 and 14 may be identical to the frame module 111 of FIGS. 6-11 so that the same reference numeral has been applied in FIGS. 13 and 14, the aperture 410, FIG. 13, being covered by the foot member 130 in FIGS. 6-11.

The adapter module 400 may have a pair of flat raised parts such as 400A, FIG. 13 for resting stably on a flat surface with the handle uppermost. The module 400 has external closure walls 411-416 and butts against frame element 121 so as to provide a first chamber 421 open only at an end 421A, and a second chamber 422 closed at both ends by walls 414 and 416.

A power cord 430 includes a coiled section 430A stored in chamber 421 and further section 430B extending in chamber 422. An inner end portion 430C of the power cord extends from chamber 422 to a central chamber 433 and then through aperture 410, FIG. 13, in frame 111 and into the interior of the portable device. The AC power may be supplied to a suitable power supply circuit within the portable device. Alternatively the power supply circuit may be located within chamber 422, for example.

As shown in FIGS. 12 and 14, a conventional power plug 440 is affixed at the outer end of the power cord and when not in use may be engaged in slots 441 in a closure wall 416A at the adjacent end of chamber 422.

When the power cord 430 is to be connected with commercial AC power, the plug 440 is disengaged from the slots 441 in wall 416A, and the coiled section 430A withdrawn as far as necessary from chamber 421 through the open end 421A.

FIGS. 15 and 16 show a non-portable version 500 which may be constructed primarily from the same components as the portable version of FIGS. 6-11. In FIGS. 15 and 16, the frame module 111 may be identical to frame module 111 of FIGS. 6-14 and receive the same reference numerals. In FIGS. 15 and 16, the printer case is identical to the case 270 of FIGS. 6-11 and has the same reference numeral applied thereto. Since the printer case 270, FIG. 16 has been reversed in its receiving space of frame 111, the frame side walls 121 and 123 are to the right and left relative to the control panel 118 which is considered to be at the front of the device.

In FIG. 15, printer cover 117 and paper outlet slot 117A are identical, but are of reversed orientation along with the printer module and printer case 270.

In FIGS. 15 and 16, the receptacle for the terminal module 114 simply receives a cover plate 510, while in place of foot member 130, FIG. 7, the frame module 111 receives a terminal side bracket 520, which secures to the frame in the same manner as foot member 130, FIG. 8, or AC module 400, FIG. 12. The terminal side bracket 520 receives a terminal module 114 identical to that of FIG. 7. Reference numerals 150, 152 and 222 are applied in FIG. 15 and have been explained in relation to FIGS. 7 and 9.

The aperture 410, FIG. 13, in the frame module 111 is of a size and location to accommodate the cable 160, FIG. 7, for the case of the embodiment of FIGS. 15 and 16.

The paper tray module of FIGS. 15 and 16 may correspond with the paper tray module 112 of FIGS. 7 and 8, but may be of substantially greater depth so that paper bin 180-1 of FIG. 16 may accommodate a substantially greater number of paper sheets, e.g. two hundred paper sheets instead of fifty.

In each of the embodiments of FIGS. 6-11 and 15 and 16, the printer module 350, FIG. 11, may be completely removed from the unit by vertically aligning limit pin 360 under disk 355, FIG. 11, and then lifting module 350 vertically so that pin 360 travels upwardly along channel 301a as the disk is lifted from its receiving recess 356, FIGS. 9 and 10. The electrical connections may be of the pin and socket type so as to readily severed, and readily reestablished.

The present application is a continuation in part of copending application Ser. No. 07/227,195 with respect to the subject matter of FIGS. 6–16 and APPENDIX A.

DESCRIPTION OF FIGS. 17–21

FIG. 17 shows subject matter similar to the first and seventh figures of the incorporated application Ser. No. 07/305,302 but in a more detailed manner and illustrates a presently preferred vehicle mounted docking unit 600.

In FIG. 17, frame 601 may be a rigid part of a vehicle such as a forklift truck, delivery van, or the like. The docking unit may have a mounting stand 602 including a base 603 secured to frame 601 and an upright 604 which adjustably carries the docking unit terminal receptacle means 606. Receptacle means 606 has a channel 607 for receiving a data entry terminal 10 such as shown in FIGS. 1,2,3A,3B, 4 and 5. The terminal alternatively may be an RF terminal unit 610 and have a RF antenna 611 at its upper end as in the first incorporated figure of Ser. No. 07/305,302.

Receptacle means 606 may have opposing sidewalls 622 and 624 which are interconnected by rear wall 626. Front wall parts 628A, 628B and 628C cover only the margins 610a, 610b and 610c of the terminal avoiding interference with keypad 629 of data entry terminal 610. Bottom wall 630 interconnects with sidewalls 622 and 624 and the front wall parts and the rear wall 626. Contact elements 632 normally project above the level of bottom wall 630. Guide rails 634, 635 (FIG. 19) have sloping upper edges 634a, 635a to engage data entry terminal 610 as it is inserted into channel 607, so as to guide the terminal into proper alignment with contact elements 632.

The parts 622, 624 and 626 fit within a mounting frame 640. The frame 640 has a housing 641 at its rear side which is carried by an adjustment mechanism 642 of vehicle mount 602.

Figure 21:
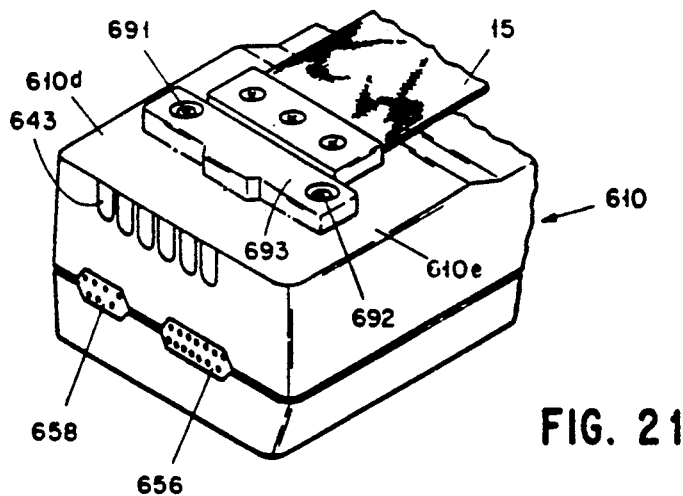
FIG. 21 is a partial perspective view showing details of the RF data terminal of FIGS. 17-20.

Contact elements 632 are arranged in spaced apart fashion in correspondence with the spacing of contact pads such as 94, FIG. 5, or 643, FIG. 21. A gap 642 is present in bottom wall 630 and between parts such as 628A and 628C to accommodate connector 645 FIG. 18.

Detents 650 and 652 (see FIG. 19) may be carried on tabs such as 654, FIGS. 17 and 18, which have upper margins integral with rear wall 626. The tab 654 accommodate resilient deflection of the detents as the terminal 610 is inserted into channel 607. The detents 650, 652 define a fully inserted position of the terminal 610 wherein a desired degree of contact pressure has been established between contact elements 632 and contact pads 643, FIG. 21.

In the embodiment shown in FIG. 21, the RF terminal 610 has a connector 656 providing for signal communication according to the RS-232 format. In this way terminal 610 may be compatible with earlier versions of docking system utilizing pin and socket type connectors. Where the docking unit 600 is to receive RF terminals according to FIG. 21, but which are not equipped with a LAN interface (e.g. as shown at 77, 92, 93, FIG. 3B), such docking unit may be provided with a cooperating pin type connector 657 which is fully engaged with the terminal connector 656 when the terminal is inserted in channel 607 to the position established by detent means 650, 652.

When such transitional type terminal units are no longer required, the connector 657 may be dispensed with. An advanced type of RF terminal may omit both connectors of the ninth incorporated figure of Ser. No. 07/305,302, so that the terminal is entirely free of recesses of the type indicated in the ninth incorporated figure and at 656 and 658 in FIG. 21. In this case, coupling to a separate reader unit such as 675, FIG. 17 may be by means of a wireless link avoiding the use of connector 656, FIG. 21, and coiled cable 674, FIG. 18. All electrical contact type connections will then take place through contact pads such as 643, FIG. 21, which are generally flush with the exterior of the terminal unit for maximum imperviousness of the terminal to contaminants and mechanical damage.

A connector is indicated at 676 in FIG. 17, for providing quick connection and disconnection with a flexible cable leading to a suitable interface means. A power connector 677, FIG. 17, may receive charging power via a second flexible cable. The second flexible cable may be connected with a battery charger for charging the batteries of terminal unit 610, and the battery charger may be energized from vehicle electric power as previously described.

Figure 19:
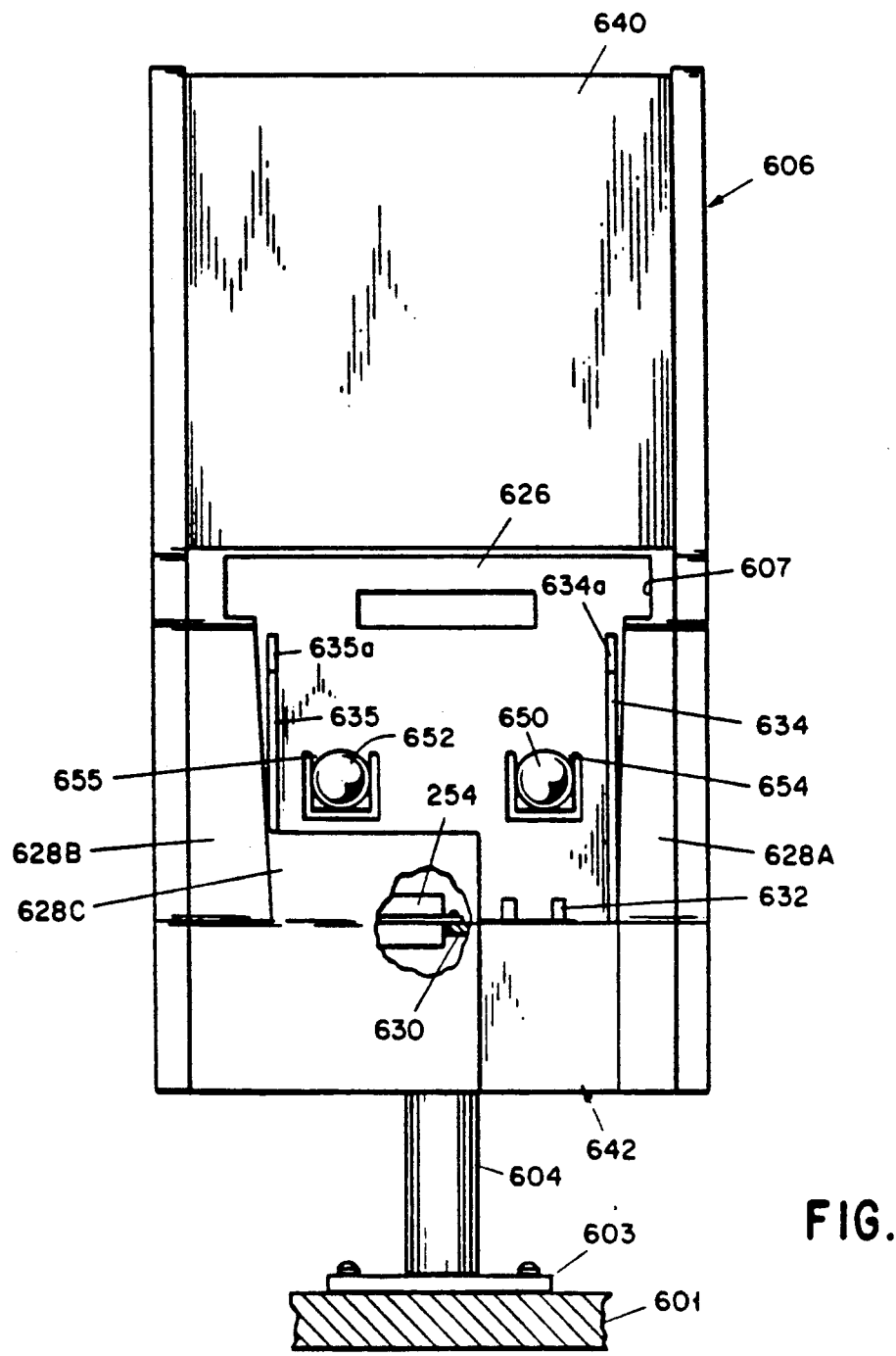
FIG. 19 is a somewhat diagrammatic frontal elevational view of the terminal docking unit, with a portion thereof broken away to shown internal parts.

Certain pin positions of connector 676 and the pins of power connector 677 may be connected via suitable interface circuitry with respective spring loaded contacts 632 so that all connections with a data terminal unit are via its contact pads 643, FIG. 21. Other pin positions of connector 676 may connect with pin positions of connector 657 to accommodate transitional type terminals which are not equipped to operate exclusively via the open type abutting contact means 94, FIG. 5, or 643, FIG. 21.

Where the terminal 610 has a hand strap as indicated at 15, FIG. 4, the rails 634, 635, FIG. 19, may be configured to insure that such strap and its mounting parts do not interfere with insertion of the terminal into channel 607 of the terminal receptacle means 606. Thus rails 634, 635 may engage the terminal at regions such as indicated at 610d and 610e, FIG. 21.

Referring to FIG. 18, a plurality of contact elements 632 are deployed within a contact receiving block 678 of insulating material. Each contact element 632 comprises a formed resilient conductive strip having a first leg 680 in a fixed position. A second deflectable leg 682 of each strip is provided with a generally U-shaped section for projecting into channel 607. First leg 680 and second leg 682 are formed in generally parallel relationship and are connected by a reverse bend 688. Contact elements 632 are constructed of electrically conductive material with sufficient resilience so that deflectable leg 682 will return to a position with its free end at the upper end of a confining slot when not subjected to deflective force.

Each contact element 632 is fitted into contact receiving block 678 such that contact elements 632 are spaced apart in parallel insulated relationship with the U-shaped sections of legs 682 projecting into channel 607 as shown in FIG. 17. Second legs 682 are deflectable downwardly to the position shown in FIG. 18 as the terminal unit reaches fully inserted position. First leg 680 of contact element 632 is provided with a protrusion for establishing electrical contact with a conductive area on circuit board 690, FIG. 18, to which contact receiving block 678 is secured.

Referring to FIG. 18, it can be seen that contact receiving block 678 is positioned so as to extend into an opening of bottom wall 630.

Further details concerning a preferred embodiment of contact spring arrangement particularly for terminal unit 10, FIGS. 1,2,3A,3B, 4 and 5 are found in a pending application of Patrick H. Davis, U.S. Ser. No. 07/327,660 filed Mar. 23, 1989, now abandoned, and the disclosure including figures one through six of the drawings is hereby incorporated herein by reference in its entirety. The second figure of this incorporated application Ser. No. 07/327,660 shows indentations for terminal 10, which correspond with indentations 691, 692, FIG. 21.

The indentations 691, 692 receive the detents with a discernible abrupt action which advises the operator that the fully inserted position has been reached. FIG. 18 shows one of the detents, e.g. 650, engaged in a cooperating segmental spherical indentation 691 of the terminal. As the terminal is removed from channel 607, the detents 650 and 652 are cammed out of the receiving indentations 691, 692 by the mating segmental spherical surfaces thereof against the bias of the tabs 654. As a plate 693 containing indentations 691, 692 clears the detents, the detents assume a normal position as shown in FIG. 17. Upon insertion of the terminal, its plate 693 cooperates with the segmental spherical external surfaces of the detents to deflect the detents rearwardly until the cooperating indentations of the terminal are moved into register therewith.

The front wall sections 628A, 628B may have raised ribs such as 694, FIGS. 17 and 18 with tapered upper ends 694a for cooperating with rails 634, 635 in the low friction guidance of the terminal into a precise position relative to spring loaded contact elements 632.

The employment of detents 650 and 652 in cooperation with indentations 691, 692, FIG. 21 permits frame 640 to be disposed in other than generally vertical orientation while still maintaining a secure retention of data entry terminal 10 or 610 in the docking unit with firm reliable interengagement of contact pads such as 94, FIG. 5, or 643, FIG. 21, with contact elements 632 in spite of vehicle Jarring and vibration.

Figure 20:
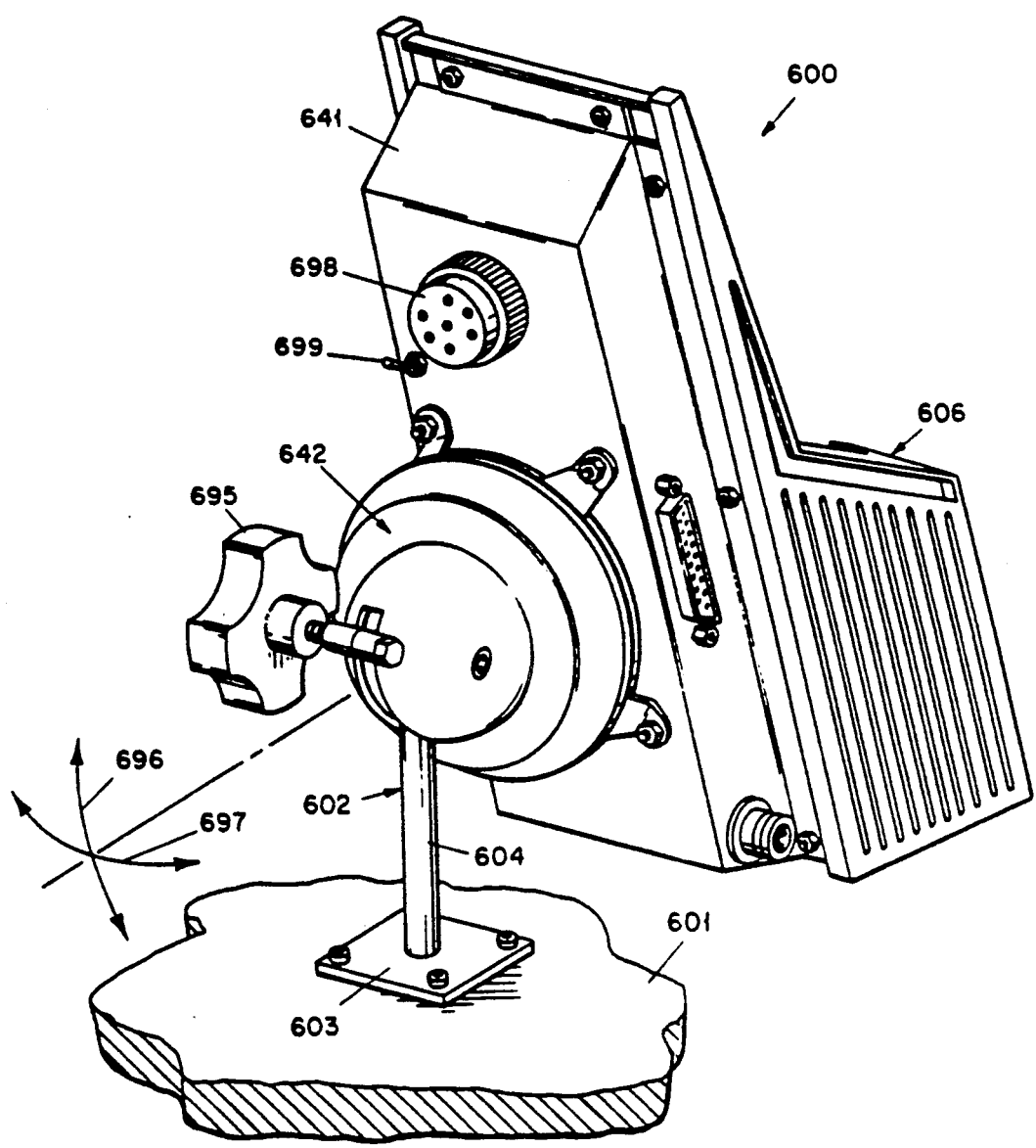
FIG. 20 is a somewhat diagrammatic rear perspective view of the docking unit of FIGS. 17, 18 and 19 showing an exemplary adjustable mount for adjustably positioning the terminal receptacle means at any desired angular orientation, e.g. so as to facilitate operation of the terminal keyboard and observation of the terminal display while the terminal is inserted into the docking unit.

FIG. 20 shows a rear perspective view of the docking unit, showing a handle 695 which serves to loosen a clamping arrangement so that the terminal receptacle means 606 can be angularly adjusted fore and aft as represented by double headed arrow 696 and/or swiveled laterally about the axis of post 604 as indicated by double headed arrow 697. A preferred adjustment mechanism 642 is commercially available and is covered by U.S. Pat. No. 2,898,068.

Also shown in FIG. 20 is a signalling means 698 such as a horn for communicating with the operator particularly in a high noise environment. Toggle switch 699 may serve to disable the signalling means 698 when a high intensity audible signal is not required. The horn mechanism 698 is to be placed inside housing 641 in a future version.

DISCUSSION RE FIGS. 17-21

FIGS. 17 and 18 show a holster 700 on base 601 for receiving and securely retaining a scanner 675, e.g. by a resilient liner 701 of the holster 700 frictionally engaging with a barrel 702 of the scanner. The holster 700 may be constructed to hold the handgrip part 704 and trigger 705 (FIG. 18) clear thereof so that the scanner is quickly and easily removed by manually grasping the handgrip part 704, and so that the trigger 705 will not be actuated as the scanner is manually inserted into the holster. FIG. 18 shows a resilient liner 701 and stop elements 706 of resilient material.

The scanner for bar codes need not be physically attached to the terminal. In configurations for warehouse scanning systems, a lot of the software effort involved may represent the accommodation of the periodic removal of major sections of the system to do remote scanning of marginally accessible codes. In conventional practice the scanner is always attached to the terminal by a pendant cable and if the code to be scanned is beyond the reach of the cable then the terminal must necessarily be removed from its holster. The terminal may represent a very significant portion of a "LAN" system and to remove it in this fashion may disable the system generally. Placing the terminal in its holster again may entail the reestablishment of the hierarchial or virtual address structure that was established prior to the removal of the terminal.

If, however, it is possible to only remove the scanner and to not be tied to the terminal by a cable then the degree of disability imposed upon the "LAN" system is significantly lessened and the software effort to develop such a system would be reduced.

The terminals now incorporate various types of scanner interfaces. Some of them have been add-on devices to accommodate scanner types manufactured by third parties. Others have been built-in and have been used to communicate with scanners such as shown in U.S. Pat. No. 4,766,300. Some of these hand-held terminal devices provide power converters accommodating the requirements idiosyncratic to specific scanner types. All of such scanners directly draw power from the terminal, reducing operational time per battery charge.

A scanner such as 675, FIGS. 17 and 18, may be operated while disconnected from the terminal on a permanent basis. Terminals presently connect with a host by an RF link and maintain contact without benefit of cable. Of course, terminals mounted on a vehicle will be drawing their power from the vehicular electrical system. The power requirements for a scanner connected by cable to a terminal on a vehicle as in FIGS. 17 and 18 will not be a large factor in the power budget imposed upon the terminal.

Detaching the terminal from the scanner completely, provides benefits in the area of flexibility and ease of use. Since the scanner doesn't require contact with or attachment to the terminal the job of providing operating power no longer is the province of the terminal. The scanner, being completely portable would require its own battery pack but this pack would not have to be unusually capacious. Once the scanning function has been performed the scanner can be reinserted in its holster on the vehicle and charged back up to full capacity from vehicle power by its own charger.

The communication link replacing cable 674, FIG. 17, may be ultrasonic but could also be infrared or even another very low power RF link. Various modulation and demodulation schemes could be employed and the choice of the most appropriate means of encoding data on the channel would depend greatly upon the channel type used. Once the code had been read, the link between the scanner and the terminal could employ one of the various error checking and correcting procedures.

Physically the terminals would still incorporate a form of scanner interface but the link would not be mechanical. It would be desirable to provide a bidirectional data path. The scanner would include the matching interface to implement the link and using a bidirectional data path the scanner could receive an acknowledgement after a scan. Reception of such an acknowledgement would constitute an indication of a valid scan and the illumination of an indicator light would provide operator feedback. The lack of a response from the terminal in a specified time period would constitute a negative acknowledgement and another indication on the scanner would signal the operator that another scan was necessary.

Appropriate scanners for this type of operation would include current wand and modified CCD type scanners of Norand Corporation and a number of other manufacturer's laser scanners.

This scanner would be used typically, by a forklift operator in close proximity to his vehicle. Limited range would not be a significant deterrent here and may even be a benefit in an operation where multiple units are in use.

DISCUSSION RE APPENDIX A, FIGS 6-16 and FIGS. 17-21

The incorporated patent application of U.S. Ser. No. 07/305,302 filed Jan. 31, 1989 shows a high performance data terminal coupled to a ruggedized printer. (Appendix C, pages 62, 63, 64.) Appendix C has not been reproduced here, but is available together with Appendices A, B, and D in the application papers. This showing is included in Appendix A hereto. This printer may utilize a cradle type docking configuration such as shown in the present FIGS. 6 through 16, and also as shown in the pending application of George E. Chadima, Jr. and Darald R. Schultz U.S. Ser. No. 07/227,195 filed Aug. 2, 1988, this application is incorporated herein by reference as showing portable and van-mounted printer systems to which the docking unit contact arrangement of the present invention may be applied.

By way of example, referring to FIG. 7 in place of pin type connector 154 at the fixed end of the terminal receptacle, an open, abutment type contact arrangement such as represented by spring contact elements 632, FIGS. 17 and 18, may be applied to the movable retainer part 150, FIG. 7, with a suitable flexible electrical connector (in place of 160), so that a terminal such as 10, FIGS. 1, 2, 3A, 3B, 4 and 5, can have its bottom end inserted into engagement with the movable retainer, utilizing manual force on the terminal 10 to displace the retainer against the action of its biasing spring 94, FIG. 7. When the receiving space of the receptacle is sufficiently large the upper end of the terminal may be pressed into the receptacle. The retainer will then hold the terminal in the seated position by virtue of its overhanging lip 222, FIG. 7, with external contact pad means such as 94, FIG. 5, in pressure engagement with the spring contact elements. The spring bias (194) on the retainer (150) will exert a greater force than the contact spring elements so that pressure engagement is established corresponding to that represented in FIG. 18. To remove the terminal, the sides of the terminal should be manually accessible so that the terminal can be manually shifted against the action of the spring bias (194) on the retainer (150) whereupon the upper end of the terminal can be lifted out of the receptacle and the terminal disengaged from the retainer (150).

This same description applies to FIG. 15 herein and to the fifteenth figure of the incorporated application Ser. No. 07/227,195 which shows a van-mounted printer system. As shown in FIG. 15, and by sheet one of APPENDIX A, the display is fully visually observable by the operator, and the keyboard is completely manually accessible while the terminal is in the printer receptacles of FIGS. 7 and 15.

The various parts of the docking unit receptacle means 606 may be identical to parts forming a wall mounted docking unit. Further details of a single docking unit for home or office use and of a wall or table mounted multiple docking assembly utilizing many parts identical to those of FIGS. 17-20 is found in a pending application of Patrick H. Davis, entitled "RECHARGING AND DATA RETRIEVAL DOCKING APPARATUS" U.S. Ser. No. 07/327,660 filed Mar. 23, 1989, and the disclosure including the drawings of this pending application is hereby incorporated herein by reference.

FURTHER DISCUSSION RE A WIRELESS SCANNING SYSTEM

The components of the system are: Scanner e.g. 675, FIG. 17, (or multiple scanners); holster e.g. 700, FIG. 17, to accommodate the scanner(s)S data terminal (hand-held, vehicle mount, counter or work surface mount, wall mount, or other,) e.g. 10, FIGS. 1, 2, 3A, 3B, 4 and 5, or 610, FIGS. 17-21.

Functions of the components: Data terminal: One of many classes of data terminals described above which processes, stores, and/or communicates (via RF, cable or modem) data which is entered to it from an entry means. Such entry means may include, but not be limited to: keyboard, scanner, modem, voice, DEX/UCS.

Compatible terminal: A data terminal which has additional circuits and hardware to communicate with the wireless scanner without electrical or physical connection to the wireless scanner. The communicating medium is RF, magnetic and/of ultrasonics. The data is transferred via a low power RF magnetic link or through an ultrasonic link.

Scanner: One of many classes of scanners which typically read bar code information or other machine readable codes (wand, laser, flash type). The scanner may incorporate some degree of user interface such as a keyboard and/or display.

Wireless scanner: A scanner which incorporates an integral power source by which the wireless scanner is able to read, process (if necessary) and communicate the read code to a compatible terminal without having physical or electrical cable connection to the terminal. These batteries may be the rechargeable type. The wireless scanner incorporates circuits to process (if necessary) and communicate the read code to a compatible terminal. The data is transferred via a low power RF or magnetic link or through an ultrasonic link. The communicating medium is RF, magnetic and/or ultrasonics. The wireless scanner utilizes a power source consisting of batteries. The scanning device has a self contained power supply which may include, but not be limited to, Nicad batteries. The scanning device may be placed in a holster device which may provide charging of the scanning device batteries.

Holster: The holster device in addition to holding the scanning device, may provide charging of the scanning device batteries from the holster device batteries or from some other power source. Thus, a holster device can be portable or it can be fixed. The holster device may be worn on a belt around the waist, or mounted to a vehicle.

DESCRIPTION OF FIGS. 22 AND 23

FIG. 22 shows a hand-held data capture terminal 710 which corresponds with terminal 10 of FIGS. 1-6, except for the provisions of depressions 711 and 712 in the integral rib 714, FIG. 5, for cooperation with the detents of a docking unit corresponding to that of FIG. 17 but provided with a contact spring arrangement as shown in the first, third fourth and fifth figures of the incorporated application of Patrick H. Davis, U.S. Ser. No. 07/327,660 filed Mar. 23, 1989.

The terminal 710 has twelve external contact pads 717 corresponding to pads 94, FIG. 5.

DESCRIPTION OF FIG. 23

FIG. 23 shows a new battery compartment hatch 727 which is applied to the lower housing part 12 the same as illustrated for hatch 27 in FIG. 2. The battery hatch 727 has a plurality of conductive metallic type spring contacts 730 which are relatively highly deflectable during engagement with the battery pack 28. It is found that with the greater range of deflection of the spring arms 730, these arms maintain contact with the batteries of the battery pack 28 during any vibration or motion caused by impact with the terminal. Thus, the batteries may move somewhat to compress springs 72, FIG. 5, but during such movement will not lose contact with the spring arms 730, FIG. 23.

In accomplishing this improved reliability, the material for the hatch part was changed from high-impact Borg-Warner Cycolac brand ABS thermoplastic, Grade KJU (for part 27) to fifteen percent glass-filled PET (polyethylene terephthalate) molding compound. The early contacts (30) were of beryllium copper 0.012 inch thick with a semicircular contact part of radius 0.110 inch. The new contacts (730) were of C17200 beryllium copper one-fourth H, 0.007 inch thick; heat treated for two hours at 600° F. after being formed. The curved part 730a had a inside radius of 0.130 inch, but the center of curvature of this radius was at a distance of 0.23 inch from the spring arm base portion 730b. The angle portion 730c of each spring arm formed an angle of fifty eight degrees with the base portion 730b.

With the new construction, the spring contacts with each end of the batteries of the battery pack continuously remained in contact with the batteries during any motion of the batteries as a result of vibration or impact.

DESCRIPTION OF FIG. 24

Figure 24:
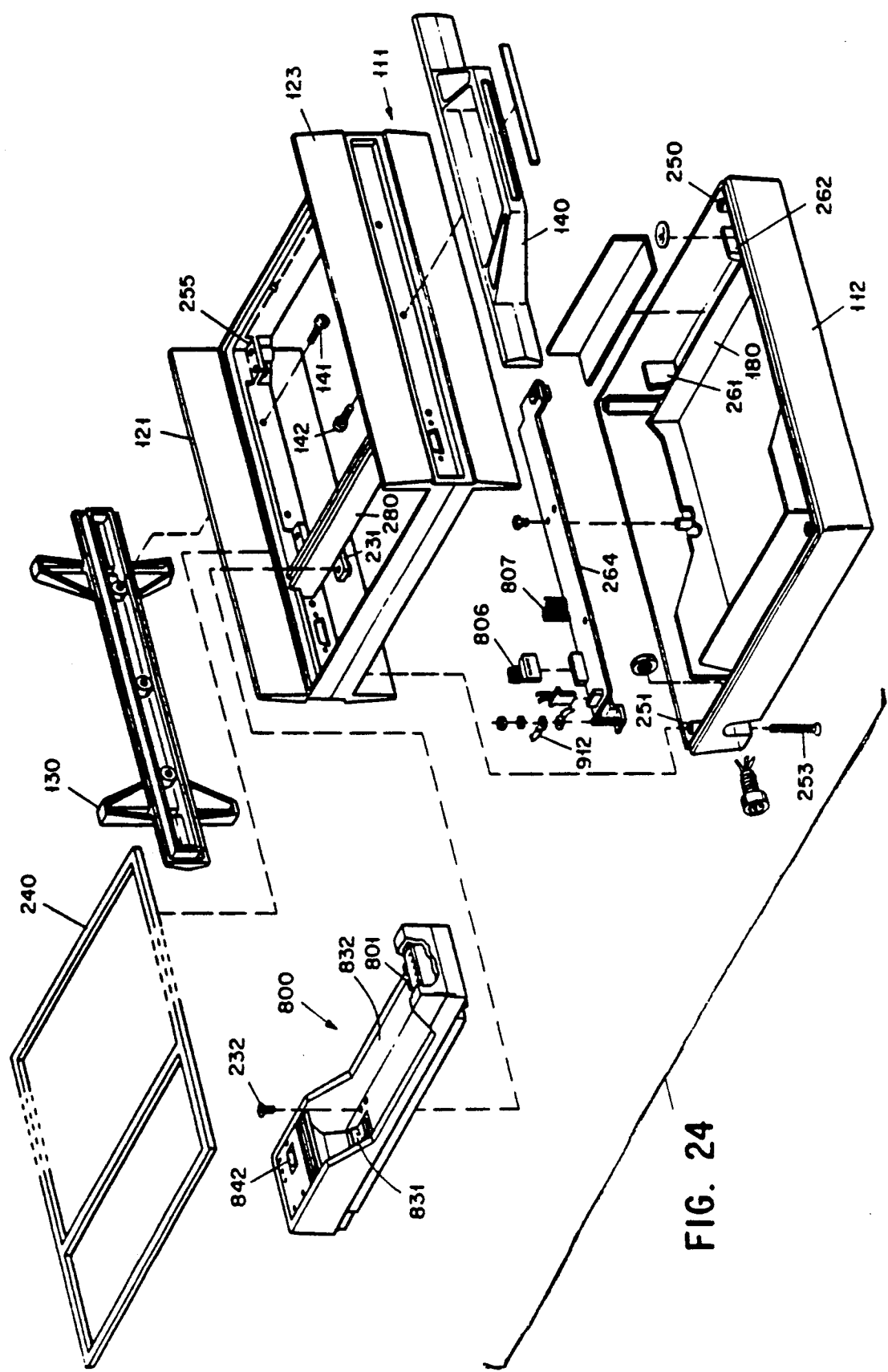
FIG. 24 is a somewhat diagrammatic exploded perspective view showing details of the printer system of FIGS. 6-16, and showing the use of a new type of docking module with the printer system for enhanced ease of loading and accommodating the terminal configuration of FIGS. 1, 5 and 22, for example.

FIG. 24 is an exploded view showing a new snap lock type docking module 800 for association with the remaining parts of the modular printer system of FIGS. 6-16.

FIG. 24 shows the following parts identical to those of FIGS. 6-16:

| Element of FIG. 24 | Location in FIGS. 6-16 |
| --- | --- |
| frame 111 | FIGS. 7 and 15 |
| paper tray module 112 | FIG. 6 |
| frame elements 121, 123 | FIG. 6 |
| foot member 130 | FIG. 7 |
| handle member 140 | FIG. 6 |
| fastening elements 141, 142 | FIG. 8 |

-continued

| Element of FIG. 24 | Location in FIGS. 6-16 |
| --- | --- |
| paper bin 180 | FIG. 8 |
| tabs 231 | FIG. 10 |
| screws 232 | FIG. 10 |
| bosses 250, 251 | FIGS. 8 and 10 |
| screws 253 | FIG. 10 |
| corner tabs 255 | FIG. 8 |
| retaining fingers 261, 262 | FIG. 9 |
| printed circuit board 264 | FIG. 7 |
| crosspiece 280 | FIG. 10 |

Figure 25:
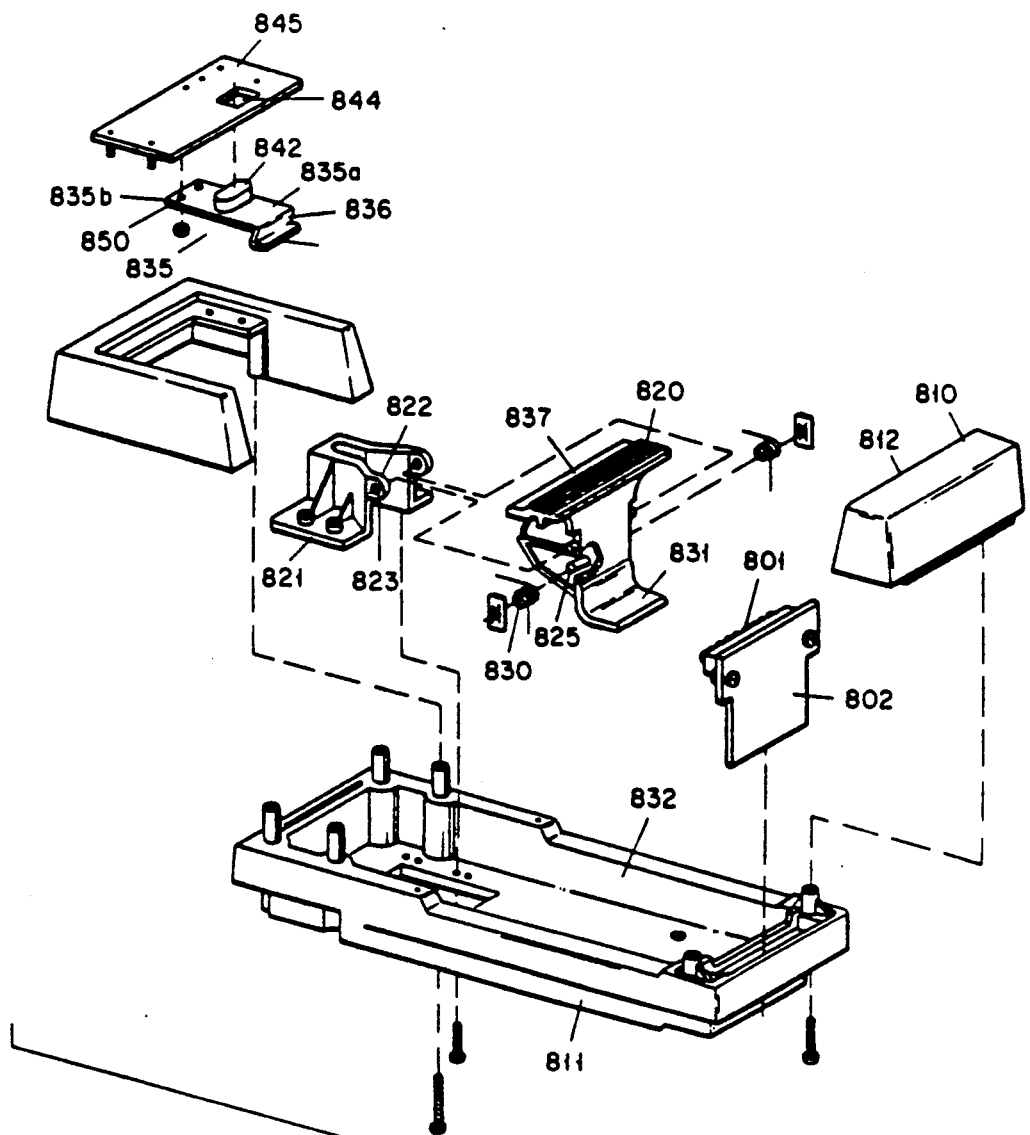
FIG. 25 is a somewhat diagrammatic exploded side elevational view of the new docking module shown in FIG. 24.

FIG. 25 shows a somewhat diagrammatic exploded side elevational view of the terminal docking module 800. The docking module has a series of spring contact fingers 801 mounted by means of printed circuit board 802. The spring fingers may be arranged as shown in Ser. No. 07/327,660 filed Mar. 23, 1989, so as to engage with the contact pads 94, FIG. 5. A connector 805 and ribbon cable 806, FIG. 24, provide electrically conductive paths between the spring fingers 801 and associated paths on board 802, and printed circuit board 264, FIG. 24. Ribbon cable 807, FIG. 24, leads from printed circuit board 264 to the controller for the printer which is mounted at 301, FIG. 10. By way of example, for an embodiment of portable briefcase printer, the cable 806 may be a sixteen conductor ribbon cable having a length of twenty inches, and serving both for power and data input/output. A similar cable of greater length may be used when module 800 is mounted in a vehicle remote from the printer.

Figure 26:
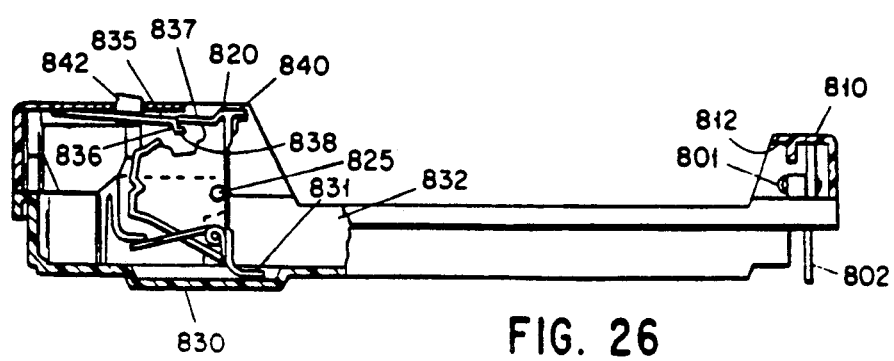
FIG. 26 is a side elevational view of the docking module of FIG. 25, with portions broken away and in section, so as to reveal details of internal construction.

A cover member 810, FIG. 25, is secured module base 811, and provides an overhanging lip at 812, FIG. 26, for retaining the lower end of a terminal such as 10, FIG. 1.

At the opposite end of module base 811, a latch part 820, FIG. 25, is mounted for pivotal movement on a latch mounting bracket 821. The bracket 821 may have a pair of spaced flanges such as 822 with aligned openings such as 823 which mount trunnions such as 825 of the latch 820. A torsion spring 830 acts on the latch to urge a mechanical sensor foot part 831, FIG. 26, of the latch into the space to be occupied by the upper end of a terminal such as 10 as it is pivoted downwardly into the receptacle 832 of the docking module.

Engagement of the terminal with mechanical sensor 831 causes the latch 820 to pivot until a latch spring 835, FIG. 26, snaps upwardly to engage a bend 836 thereof behind a cooperative ledge 837 of the latch. An extension 838 of the spring 835 limits the upward movement of the spring and retains the bend 836 in blocking relationship to ledge 837 preventing reverse pivoting of the latch. The latch 820 is thus locked in an angular position wherein a projection 840 thereof overlies the terminal receiving space and securely retains the terminal in receptacle 832. Even dropping of a portable printer will not cause release of the terminal from the receptacle since the latch 820 is securely locked in the retaining angular position.

A latch release button 842 is secured to latch spring 835 and may be manually depressed to depress bend 836 and disengage it from ledge 837 whereupon torsion spring 830 returns sensor foot 831 to its initial position, partly lifting the terminal out of receptacle 832. The latch button 842 protrudes through aperture 844, FIG. 25, of a trim plate 845 so as to be accessible for manual depression to release the latch.

By way of example, the latch spring 835 may be formed from a strip of type 304 stainless steel, cold rolled, 0.015 inch thick (No. 28 gauge) and 0.875 inch wide. The bend 836 may form an angle of seventy-five degrees with the plane of the latch spring main body portion 835a, FIG. 25, so that the ledge 837 is captured at the bend 836. By way of example the height of bend 836 measured normal to the plane of body portion 835a, FIG. 25, may be 0.22 inch. Portion 835a may have a length of 1.844 inches and extension 838 may have a length of more than 0.2 inch where the overall length measured parallel to the plane of body portion 835a (FIG. 25) is 2.00 inch. The dimensions from fixed end 835b to the screw location indicated at 850 is 0.927 inch. The values 0.927, 2.00 and 1.844 were changed to these values from former values of 0.957, 2.125 and 1.913, respectively.

DESCRIPTION OF FIG. 27

FIG. 27 is a diagrammatic illustration of data flow between the printer and the terminal for FIGS. 6–16 and 24–26.

In FIG. 27, a secondary controller and interface means 900 (e.g. a type 78C10 printer controller with interface circuitry) is indicated at the right. The interface circuitry accommodates three switch selectable protocols as described in section 8.0 of APPENDIX B, which has not been reproduced here, but which is available together with Appendices A, C and D in the application papers. The controller 900 is programmed for operation as a secondary as described in APPENDIX C, e.g. at Section 4.4.9 Secondary State Machine, and Section 6.0 PRINTER PRESENTATION LAYER. In particular it is to be noted that with the protocol according to the present invention, the secondary controller 900 when the printer finishes printing the print line or lines in a print command, returns a response with the same sequence number so that the terminal e.g. 10, FIGS. 1, 2, 3A, 3B, 4, 5 and 22, or 610, FIGS. 17-21, is advised as which print lines are actually printed.

As represented in FIG. 27, the signals TXD, DTR, RTS, RXD and CTS may be coupled e.g. via flexible cable 807, FIG. 24, to the printed circuit board 264. The signal paths on the printed circuit board are indicated at 907, FIG. 27. The ribbon cable 806, FIG. 24, is indicated in FIG. 27, and leads to the 15 pin D-sub connector 154, FIGS. 7, 9 and 10, or to the spring fingers such as 801, FIG. 25, a docking means such as 114, FIGS. 6, 9 and 15, or 800, FIGS. 24-26, being indicated at 908, FIG. 27.

A primary controller is indicated at 910, FIG. 27, and may be implemented as shown at 74, 78, FIG. 3B, for example, and as described in APPENDIX C. Thus the primary controller 910 may be part of a data device means 912 such as terminal 10 or 610. The electrical interface is described in Section 2.2.2.2 of APPENDIX B.

A braided power ground strap 912, FIG. 24, may connect with the power ground terminal of connector 154, FIGS. 7, 9 and 10, or to the power ground spring contact of contacts 801, FIG. 25.

DISCUSSION OF THE MODULAR PRINTER SYSTEM

In prior art van mounted printers, communication with a data source such as a hand-held data capture terminal was limited such that it was possible for the printer to fail to print a line or more of data without alerting the terminal. Such printers could acknowledge receipt of a line of data from the hand-held data capture terminal, but there was no provision for a feedback signal to the hand-held data capture terminal to signify that a particular data line had actually been printed. Thus, where the printer accumulated several lines of data in a buffer memory, and the operator then inadvertently turned off the printer, such lines of data could be lost and not actually printed. Similarly, if the vehicle engine was started causing a power spire, actual printing of data in the buffer might fail to occur without any feedback notification to the terminal.

APPENDIX B gives the product specification for a commercial version of the modular printer system. Section 6.5 of APPENDIX B describes the connector providing signals between the host and the printer controller. The electrical interface is further described in APPENDIX B in section 2.2.2.2.

A special communications protocol termed "NPCP" (Part B) is described in section 8.1 of APPENDIX B, and in APPENDIX C, and a complete specification for this "NPCP" protocol is given in APPENDIX D, which has not been reproduced here, but which is available together with Appendices A, B and C in the application papers.

DISCUSSION RE EARLY DOCKING EMBODIMENTS

In some applications, earlier developments of docking means may be utilized. For example, an integrated type scanner such as shown in the incorporated application Ser. No. 07/136,097, might have a docking means with a generally vertical receptacle channel for receiving the handle (15) up to the level of the trigger (32). At the bottom of the receptacle channel a plug may project upwardly centrally to fit into a conforming recess at the base of the handle (15). The plug and recess may have cooperating parts of a conventional telephone Jack connection for completing battery charging and communications data pathways to the rechargeable batteries (16) and data circuitry of the hand-held scanner. The plug means of the docking receptacle would have an array of external conductors (metal wires) for interfitting with a mating female connector means having deflectable springs (metal wires) in the recess of the handle (15). The conventional plug connector has a resilient retention means (latch element) automatically interlocking with the female connector with a perceptible snap action. A suitable mechanical or electrical release of the latch element of the plug connector, e.g. a miniature solenoid, is readily provided, or finger access to the plug means latch element could be provided from the rear of the docking receptacle.

The following describes further early but more recent concepts, having reference to FIGS. 28-36.

The basic functional requirements I started with was to provide a data I/O port that has non-critical mechanical alignment requirements such as optical connectors, but is capable of higher speed data transmission rates than is possible with optical connectors. The female half will be a moisture sealed contact strip that is recessed into the bottom rear corner of hand-held unit 920, FIGS, 28 and 29. The male half of the connector will be installed in a data I/O cradle 922 or other peripheral device. It will be either vertical travel plunger pins 924 or leaf spring type contacts 926.

Female Option 1: The female half will have a contact strip molded integrally into a 70 durometer rubber part 930, FIG. 30. After molding the contact strip will be trimmed to separate the individual contacts e.g. 931-936, FIG. 32.

The contact strip will be molded of rubber so that as part of the mounting it can be compressed against the inside wall 937 of the housing 938, thus providing a water tight seal. Water tightness is also the reason for molding the contact strip integrally with the rubber.

There will be ribs 939, FIGS. 30-32, molded between the individual contacts to minimize the possibility of shorting.

The contacts will be made from pre-plated spring tempered berryllium copper material at least 0.013" thick. The tail ends e.g. 931a, FIG. 30, of the contacts must be designed to deliver a high enough normal force to the PCB 94C to make gas tight connection. If room permits, the contact could also be bifurcated to increase electrical integrity. If it is within the capability of insert molding, the contact should be wrapped around the bottom of the support block 930 as at 931', FIG. 31.

If leaf spring type contacts are used, the PCB may need to be supported from the side opposite the contact fingers to insure long term reliability.

Screws 941, FIGS. 30-33, insure the connector makes good contact to the printed circuit board 940 and also secure the connector to the housing 938 and support the end of 940.

The number of contacts should be carefully selected and addressed to provide for use of this new connector on all new hand-held terminals. If charge current for rechargeable batteries is to be provided through this connector, the positive and negative leads should not be placed adjacent to one another.

The block should be thick enough to allow components on the same side of the board as the connector.

Female Option 2: Basically the same functional parameters as Option 1 except the contact strip is actually a flexible circuit 945, FIG. 33, that is formed over a solid plastic support 950.

Moisture seal will be provided by an open cell foam gasket 951 compressed between the flex circuit and the housing to less than 10% of its free thickness.

The end of the flex circuit would be soldered as at 952 into the PCB for reliable contact.

The flex circuit Kapton carrier will have to have slots punched in between the contacts to provide clearance for ribs molded onto the support block 950.

Male Option 1: Each male contact point will be a spring loaded plunger 960 that contacts the exposed strip area on the female half.

Provision could be made for sealing each of the pins with a small o-ring 965.

The terminal cradle will have latches 971, 972 for engaging detents such as 973 on the terminal housing to insure contact between the plungers and contact strip.

Wires 980 will be attached to the plungers 960 by soldering onto a peg in the center of the plunger.

The number of plungers could be adjusted as required on each peripheral to minimize cost.

Male Option 2: Have a leaf spring type contact strip 990, FIG. 36, molded into a plastic mounting block 992.

The leaf springs would contact against the bottom of the terminal and thus not require detents on the terminal to maintain engagement.

What is claimed is:

1. In a data capture system,
    data communications means for the transmission of data, the data communications means including docking means for removably receiving a portable data device and for coupling a received data device with said data communications means, and
    means for securely retaining with the docking means a portable data device when inserted into the docking means, the retaining means comprising a latch pivotally mounted to the docking means, the latch including a device retaining projection disposed to pivot into a device retaining position upon insertion of a portable data device into the docking means, and a foot member disposed to engage a portable data device during an insertion thereof into the docking means, to pivotally move the latch and the device retaining projection toward the device retaining position, and means mounted to the docking means and resiliently movable for snapping into a position blocking the latch from reverse pivotal movement and from release of an inserted portable data device from the docking means.

2. In a data capture system according to claim 1, the docking means having a data device receptacle means including a retaining lip disposed at one end thereof, the latch being disposed at a second end, opposite the end at which the lip of the receptacle means is disposed.

3. In a data capture system according to claim 1, the means for securely retaining a portable data device comprising a spring means urging the latch to pivot toward a first position wherein the latch releases an inserted portable device and the foot member partly lifts a released portable data device from the docking means.

4. In a data capture system according to claim 3, wherein the resiliently movable means further includes release means for moving the resiliently movable means from the latch blocking position, wherein upon activation of the release means the resiliently movable means disengages the latch and the spring means urges the latch to pivot toward the first position wherein the latch releases an inserted portable device and the foot member partly lifts a released portable device from the docking means.

5. In a data capture system according to claim 4, wherein the release means is a manually accessible pushbutton, wherein depression of the pushbutton moves the resiliently movable means from the latch blocking position.

6. In a data capture system according to claim 1, comprising a printer communicatively coupled to the data communications means, wherein, upon insertion of a portable data device into the docking means, the docking means communicatively couples an inserted portable data device means through the communications means to the printer.

7. In a data capture system according to claim 6, comprising a portable data device, the portable data device being a hand-held data capture terminal, the data capture terminal having external contacts for communicatively coupling the data capture terminal through the docking means and the communications means to the printer.

8. In a data capture system,
    data communications means for the transmission of data, the data communications means including docking means for removably receiving a portable data device, the portable data device including means for communicatively coupling the portable data device with said data communications means, said docking means comprising receptacle means wherein a data device is removably inserted, a latch having a foot portion disposed in a base portion of the receptacle means, a latch projection for securely retaining an inserted data device in the receptacle means, and a retaining ledge, the latch being mounted to move between a data device receiving position wherein the foot extends into the space occupied by a data device upon insertion of a data device means into the receptacle means, and a data device retaining position wherein the latch projection securely retains the data device, a spring coupled to the latch to urge the latch toward the data device receiving position with the foot extending into the space of the receptacle means occupied by a data device when a data device is inserted into the receptacle means, and means for blocking the latch from reverse pivotal movement from the data device retaining position toward the data device receiving position, the latch blocking means being selectively disengageable, wherein, upon the latch blocking means becoming disengaged, the spring urges the latch toward the data device receiving position, and the foot is urged to pivot toward the space occupied by a data device means, to partly lift a data device out of the receptacle means.

9. In a data capture system according to claim 8, wherein the receptacle means comprises a retaining lip disposed at a first end of the receptacle means of the docking means for retaining a first end of a data device inserted into the receptacle means and the latch is disposed at a second, opposite end of the receptacle means to engage a second end of the data device inserted into the receptacle means.

10. In a data capture system according to claim 8, wherein the latch blocking means comprises a resilient strip mounted at one end to the docking means and having a bend at the other end thereof, the bend of the latch blocking means being disposed in a cooperative blocking position adjacent the retaining ledge upon the latch having moved into the data device retaining position, the latch blocking means further comprising an extension extending from the bend, the extension disposed against the latch adjacent the retaining ledge to limit further movement of the latch blocking means past the cooperative blocking position adjacent the retaining ledge thereby retaining the bend in a blocking relationship to the ledge of the latch.

11. In a data capture system according to claim 8, wherein the latch projection overlies at least part of a data device when the latch is disposed in the data device retaining position.

12. In a data capture system,
data communications means, including docking means having a receptacle for removably receiving a portable data device and for communicatively coupling a received data device to the data communications means, said docking means comprising receptacle means wherein a data device is removably inserted, a latch having a foot portion disposed in a base portion of the receptacle means, a latch projection for securely retaining an inserted data device in the receptacle means, and a retaining ledge, the latch being mounted to move between a data device receiving position wherein the foot extends into the space occupied by a data device upon insertion of a data device means into the receptacle means, and a data device retaining position wherein the latch projection securely retains the data device, a spring coupled to the latch to urge the latch toward the data device receiving position with the foot extending into the space of the receptacle means occupied by a data device when a data device is inserted into the receptacle means, and means for blocking the latch from reverse pivotal movement from the data device retaining position toward the data device receiving position, the latch blocking means being selectively disengageable and comprising a resilient strip mounted at one end to the docking means and having a bend at the other end thereof, the bend of the latch blocking means being disposed in a cooperative blocking position adjacent the retaining ledge upon the latch having moved into the data device retaining position, the latch blocking means further comprising an extension extending from the bend, the extension disposed against the latch adjacent the retaining ledge to limit further movement of the latch blocking means past the cooperative blocking position adjacent the retaining ledge thereby retaining the bend in a blocking relationship to the ledge of the latch, wherein, upon the latch blocking means becoming disengaged, the spring urges the latch toward the data device receiving position, and the foot is urged to pivot toward the space occupied by a data device means, to partly lift a data device out of the receptacle means.

* * * * *